(12) United States Patent
Suzuki

(10) Patent No.: US 9,718,473 B2
(45) Date of Patent: Aug. 1, 2017

(54) TRAVEL CONTROL DEVICE AND TRAVEL CONTROL METHOD

(71) Applicant: NISSAN MOTOR CO., LTD., Yokohama-Shi, Kanagawa (JP)

(72) Inventor: Yasuhiro Suzuki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/028,560

(22) PCT Filed: Sep. 2, 2014

(86) PCT No.: PCT/JP2014/004508
§ 371 (c)(1),
(2) Date: Apr. 11, 2016

(87) PCT Pub. No.: WO2015/052865
PCT Pub. Date: Apr. 16, 2015

(65) Prior Publication Data
US 2016/0297447 A1    Oct. 13, 2016

(30) Foreign Application Priority Data
Oct. 11, 2013  (JP) ................................. 2013-213953

(51) Int. Cl.
*B60T 7/12* (2006.01)
*B60W 30/18* (2012.01)
*B60W 30/16* (2012.01)

(52) U.S. Cl.
CPC ...... *B60W 30/18163* (2013.01); *B60W 30/16* (2013.01); *B60W 2550/308* (2013.01); *B60W 2720/10* (2013.01)

(58) Field of Classification Search
CPC ........... B60W 30/18163; B60W 30/16; B60W 2720/10; B60Q 1/00; H01L 27/00
(Continued)

(56) References Cited

U.S. PATENT DOCUMENTS 5,369,590 A * 11/1994 Karasudani ............. G01S 11/12
                                                   180/167
6,388,565 B1 * 5/2002 Bernhard ............... B60Q 9/008
                                                   340/435
(Continued)

FOREIGN PATENT DOCUMENTS

JP    2002307976 A    10/2002
JP    2004268644 A     9/2004
(Continued)

*Primary Examiner* — Shardul Patel
(74) *Attorney, Agent, or Firm* — Young Basile Hanlon & MacFarlane, P.C.

(57) ABSTRACT

The possibility of a lane change of a vehicle is determined by using a first inter-vehicle distance that serves as a target for the lane change of the vehicle on an adjacent lane adjacent to a lane on which the vehicle is traveling. When the lane change is determined not to be executable, the presence or absence of a possibility that the first inter-vehicle distance will extend to a length that allows for the lane change is determined by using a second inter-vehicle distance positioned in front of or behind the first inter-vehicle distance. When it is determined that there is the possibility, waiting is determined to be necessary, and when it is determined that there is no such possibility, the waiting is determined to be unnecessary.

9 Claims, 9 Drawing Sheets

(58) Field of Classification Search
USPC ...... 701/1, 96; 340/435–437, 901, 905, 936;
250/208.1; 315/77; 348/148, E07.085
See application file for complete search history.

(56) References Cited

U.S. PATENT DOCUMENTS

| | | | |
|---|---|---|---|
| 2003/0195667 A1* | 10/2003 | Tange | B60K 31/0008 701/1 |
| 2004/0016870 A1* | 1/2004 | Pawlicki | G06T 7/13 250/208.1 |
| 2008/0055114 A1* | 3/2008 | Kim | B60R 1/00 340/937 |
| 2009/0088925 A1* | 4/2009 | Sugawara | B60W 30/12 701/41 |
| 2009/0326818 A1* | 12/2009 | Koehler | B60W 30/12 701/300 |
| 2011/0144907 A1* | 6/2011 | Ishikawa | G01C 21/30 701/532 |
| 2012/0154591 A1* | 6/2012 | Baur | B60R 1/00 348/148 |

FOREIGN PATENT DOCUMENTS

| | | |
|---|---|---|
| JP | 4366419 B2 | 11/2009 |
| JP | 2013107431 A | 6/2013 |

* cited by examiner

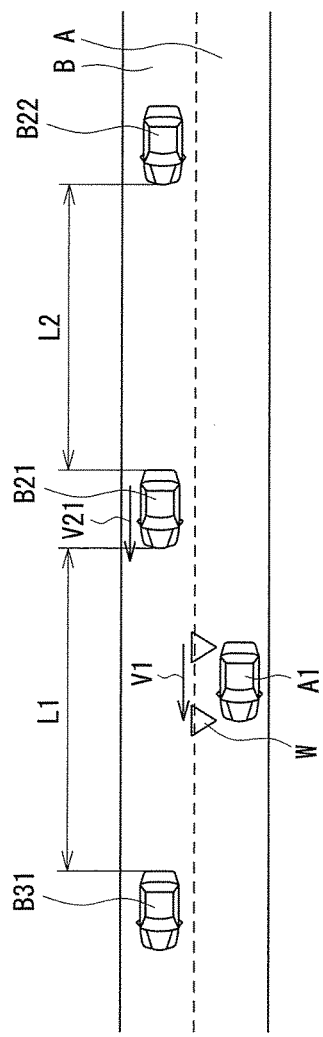
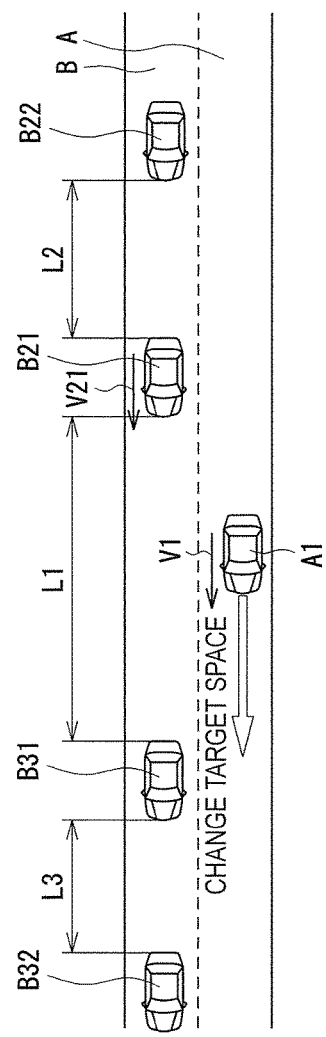

FIG. 5A

CASE OF L1 < FIRST THRESHOLD VALUE
AND L2 > SECOND THRESHOLD VALUE

FIG. 5B

CASE OF L1 < FIRST THRESHOLD VALUE
AND L2 < SECOND THRESHOLD VALUE

A: OWN LANE
B: ADJACENT LANE
A1: VEHICLE
B21: FIRST SUBSEQUENT ADJACENT VEHICLE
B22: SECOND SUBSEQUENT ADJACENT VEHICLE (VEHICLE SUBSEQUENT TO B21)
B31: FIRST PRECEDING ADJACENT VEHICLE
B32: SECOND PRECEDING ADJACENT VEHICLE (VEHICLE PRECEDING TO B31)
W: INDICATE INTENTION BY DIRECTIONAL INDICATOR OR THE LIKE
L1: INTER-LATERAL ADJACENT VEHICLE DISTANCE (LATERAL TO VEHICLE A1)
L2: INTER-SUBSEQUENT ADJACENT VEHICLE DISTANCE (BEHIND L1)
L3: INTER-PRECEDING ADJACENT VEHICLE DISTANCE (IN FRONT OF L1)
V1: VEHICLE SPEED OF A1
V21: VEHICLE SPEED OF B21
V22: VEHICLE SPEED OF B22
V31: VEHICLE SPEED OF B31
V32: VEHICLE SPEED OF B32

FIG. 8A 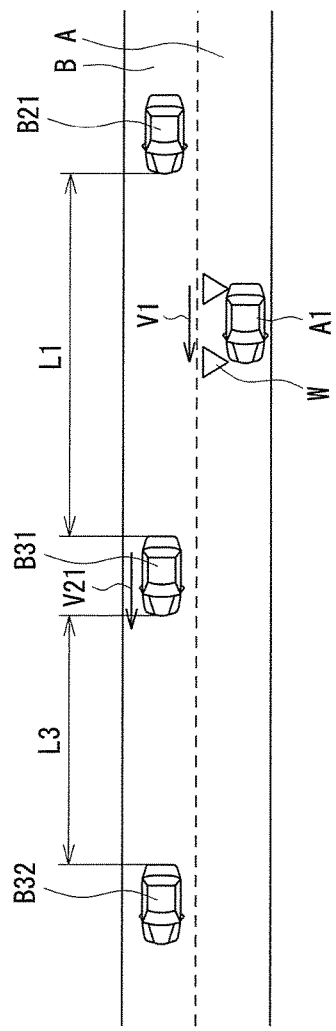

CASE OF L1<FIRST THRESHOLD VALUE
AND L3>THIRD THRESHOLD VALUE

FIG. 8B 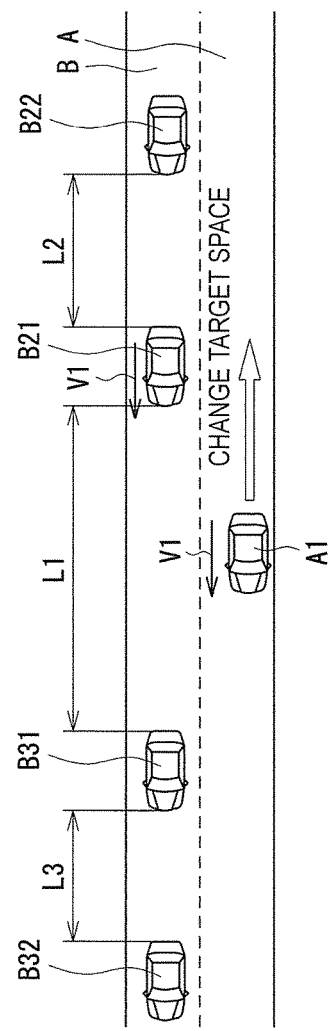

CASE OF L1<FIRST THRESHOLD VALUE
AND L3<THIRD THRESHOLD VALUE

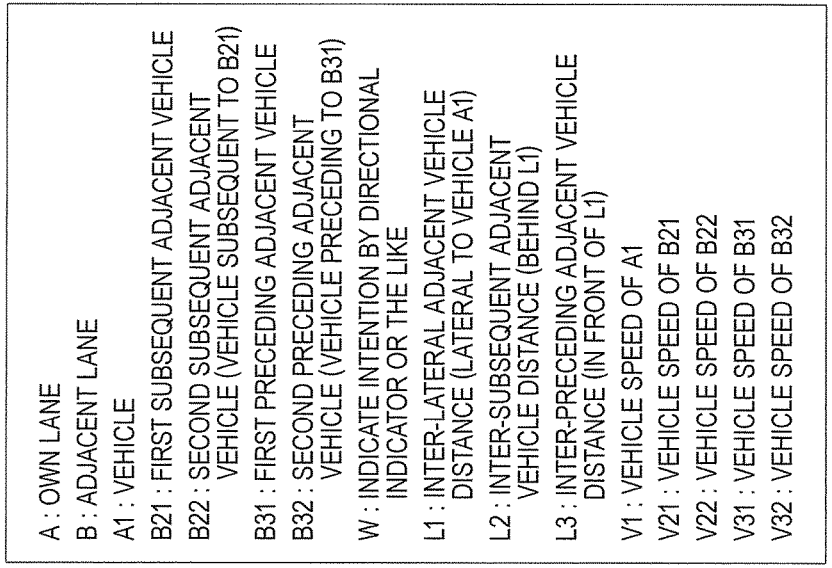

A : OWN LANE
B : ADJACENT LANE
A1 : VEHICLE
B21 : FIRST SUBSEQUENT ADJACENT VEHICLE
B22 : SECOND SUBSEQUENT ADJACENT VEHICLE (VEHICLE SUBSEQUENT TO B21)
B31 : FIRST PRECEDING ADJACENT VEHICLE
B32 : SECOND PRECEDING ADJACENT VEHICLE (VEHICLE PRECEDING TO B31)
W : INDICATE INTENTION BY DIRECTIONAL INDICATOR OR THE LIKE
L1 : INTER-LATERAL ADJACENT VEHICLE DISTANCE (LATERAL TO VEHICLE A1)
L2 : INTER-SUBSEQUENT ADJACENT VEHICLE DISTANCE (BEHIND L1)
L3 : INTER-PRECEDING ADJACENT VEHICLE DISTANCE (IN FRONT OF L1)
V1 : VEHICLE SPEED OF A1
V21 : VEHICLE SPEED OF B21
V22 : VEHICLE SPEED OF B22
V31 : VEHICLE SPEED OF B31
V32 : VEHICLE SPEED OF B32

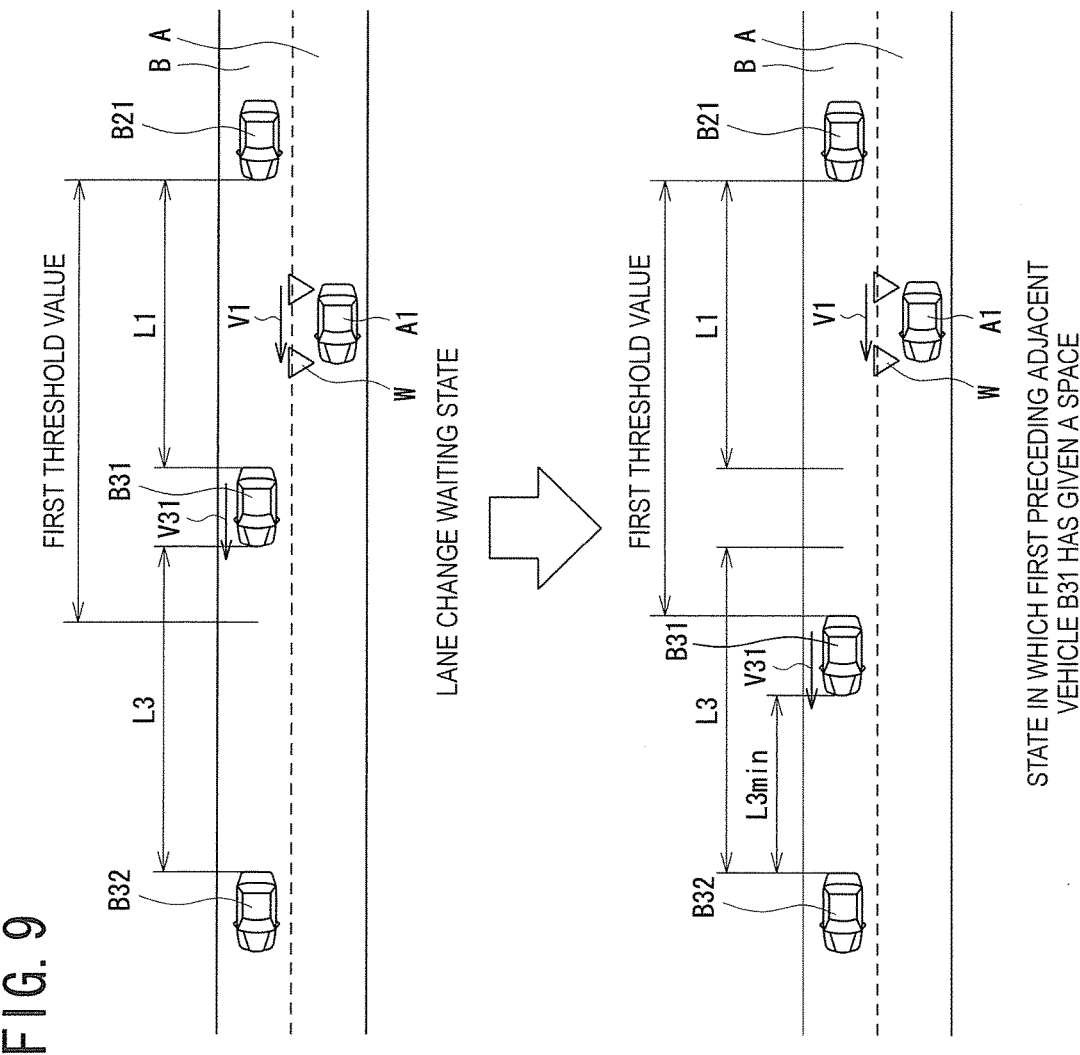

TRAVEL CONTROL DEVICE AND TRAVEL CONTROL METHOD

CROSS REFERENCE TO RELATED APPLICATION

The entire content of Japanese Patent Application No. 2013-213953, filed on Oct. 11, 2013 in which the priority right of the present patent application is claimed is herein incorporated by reference.

TECHNICAL FIELD

The present invention relates to a travel control device and a travel control method that assist a lane change of a vehicle.

BACKGROUND

When a lane change from a lane on which a vehicle is traveling, hereinafter referred to as own lane, to an adjacent lane is about to be made, existing techniques have controlled the position of the vehicle according to a spring-mass-damper model as a mathematical model that schematizes the motion of a mechanical system by using respective elements: a spring, a mass, and a damper so that the vehicle is brought to an optimum position between vehicles on the adjacent lane, and has allowed the lane change to be made at a time when an inter-vehicle distance on the adjacent lane has become equal to or larger than a threshold value while the vehicle was in the present position (see Japanese Patent No. 4366419).

SUMMARY

However, in a case of seeing only the inter-vehicle distance that serves as a target for the lane change of the vehicle when changing lanes from the own lane to the adjacent lane, there has been a problem in that the vehicle continues to wait at a position lateral to the inter-vehicle distance even if another inter-vehicle space is available for the lane change.

The present invention has focused on the point as described above, and it is an object of the invention to prevent a vehicle from continuing to wait at the position lateral to a same inter-vehicle distance regardless of the situation of an adjacent lane when changing lanes from the own lane to the adjacent lane.

In order to solve the above-described problem, according to one aspect of the present invention, there is provided a travel control device configured to acquire, in a position lateral to a vehicle on an adjacent lane adjacent to the lane on which the vehicle travels, a first inter-vehicle distance that serves as a target for a lane change of the vehicle and is an inter-vehicle distance between a first preceding adjacent vehicle in a lateral forward direction of the vehicle and a first subsequent adjacent vehicle in a lateral rearward direction of the vehicle. The travel control device is configured to acquire a second inter-vehicle distance that is at least one inter-vehicle distance of an inter-vehicle distance between the first subsequent adjacent vehicle and a second subsequent adjacent vehicle as a vehicle subsequent to the first subsequent adjacent vehicle and an inter-vehicle distance between the first preceding adjacent vehicle and a second preceding adjacent vehicle as a vehicle preceding to the first preceding adjacent vehicle. The possibility of a lane change from the lane on which the vehicle travels to the adjacent lane is determined by using the first inter-vehicle distance. When the lane change from the lane on which the vehicle travels to the adjacent lane is determined not to be executable, the presence or absence of a possibility that the first inter-vehicle distance will extend to a length that allows for the lane change is determined by using the second inter-vehicle distance. When it is determined that there is the possibility that the first inter-vehicle distance will extend to the length that allows for the lane change, waiting is determined to be necessary. When it is determined that there is no possibility that the first inter-vehicle distance will extend to the length that allows for the lane change, waiting is determined to be unnecessary.

BRIEF DESCRIPTION OF THE DRAWINGS

FIG. 5A is a diagram for illustrating a situation of waiting until a subsequent adjacent vehicle gives a space, and FIG. 5B is a diagram for illustrating a situation of traveling forward without waiting;

FIG. 8A is a diagram for illustrating a situation of waiting until a preceding adjacent vehicle gives a space, and FIG. 8B is a diagram for illustrating a situation of moving rearward without waiting; and FIG. 9 is a diagram for illustrating a state in which the preceding adjacent vehicle has given a space.

DETAILED DESCRIPTION OF THE EMBODIMENTS

Hereinafter, embodiments of the present invention will be described with reference to the accompanying drawings.

Figure 1:
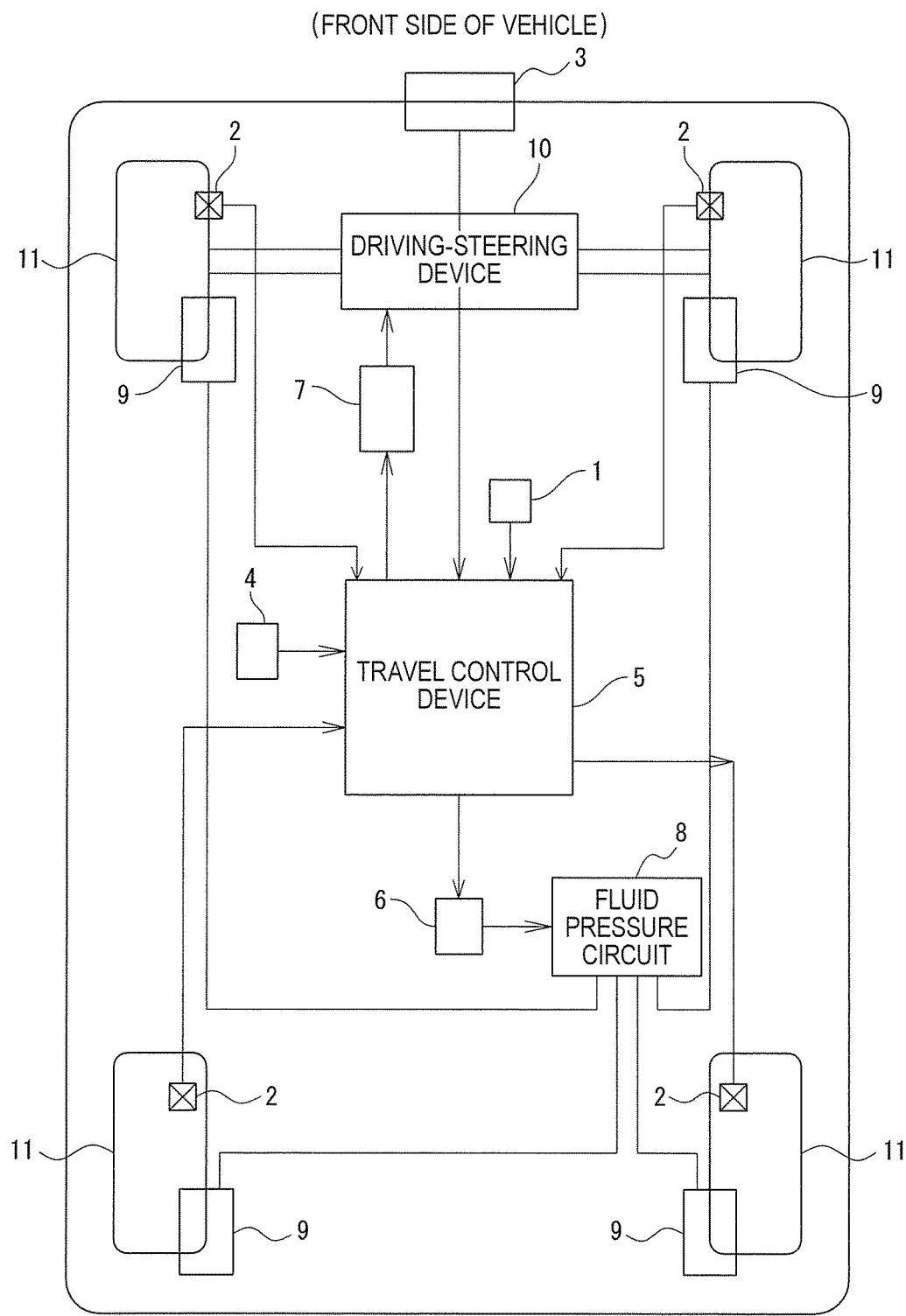
FIG. 1 is a diagram depicting a structural example of a vehicle.

As depicted in FIG. 1, a vehicle includes a control operating switch 1, a wheel speed sensor 2, an outside recognition device 3, a communication device 4, a travel control device 5, a brake controller 6, a driving-steering controller 7, a fluid pressure circuit 8, a brake device 9, a driving-steering device 10, and wheels 11.

The control operating switch 1 is an operator for instructing start and end of operation of automatic travel control including platoon travel control and ACC travel control (preceding-vehicle following travel control) or instructing change of a set vehicle speed of travel control. The state of the control operating switch is output to the travel control device 5. The control operating switch 1 is, for example, provided on a steering wheel.

Herein, traveling in platoon is to travel by forming a convoy group with a plurality of vehicles. When the vehicle is not a lead vehicle in the convoy to which the vehicle belongs, travel control is executed so as to maintain a target inter-vehicle time with respect to a vehicle preceding thereto. ACC travel control also performs travel control so as to maintain a target inter-vehicle time with respect to a preceding vehicle. However, in platoon travel control, control is made so that inter-vehicle time is shorter than that in ACC travel control in consideration of traffic efficiency.

When focusing only on following control, platoon travel control is the same as ACC travel control in terms of performing travel control so as to maintain a target inter-vehicle time.

The wheel speed sensor 2 detects a wheel speed and outputs detected wheel speed information to the travel control device 5. The wheel speed sensor 2 is formed, for example, by a pulse generator such as a rotary encoder for measuring a wheel speed pulse.

The outside recognition device 3 recognizes a preceding vehicle existing ahead of the vehicle, and, as the state of the recognized preceding vehicle, detects the presence or absence of the preceding vehicle and a traveling state thereof. Information relating to the state of the preceding vehicle detected is output to the travel control device 5. The outside recognition device 3 is formed, for example, by a laser distance meter, a laser scanner, or a camera.

The communication device 4 performs inter-vehicle communication with another vehicle(s) around the vehicle. The communication device 4 may perform road-vehicle communication with a roadside device. For example, the communication device 4 may be a combination of a communication device for performing inter-vehicle communication and a communication device for performing road-vehicle communication. The communication device 4 performs an inter-vehicle communication with a preceding vehicle(s) and a subsequent vehicle(s) existing in a previously set range to transmit and receive identifying information for performing platoon traveling, and outputs the identifying information acquired from the preceding vehicle(s) and the subsequent vehicle(s) to the travel control device 5. Traveling information of the preceding vehicle(s) and the subsequent vehicle(s) may be acquired via the communication device 4.

When it is determined that the control operating switch 1 is ON (control operation request), the travel control device 5 performs travel control for following traveling and traveling in platoon with respect to a preceding vehicle(s) on the basis of an operation state of the control operating switch 1, a vehicle speed based on a signal from the wheel speed sensor 2, the information relating to the traveling state of the preceding vehicle(s) detected by the outside recognition device 3, and the identifying information acquired by the communication device 4.

When determining that a platoon traveling operation request in the control operating switch 1 is ON (control operation request), the travel control device 5 performs inter-vehicle communication with the preceding vehicle(s) and the subsequent vehicle(s) existing in the previously set range to determine whether to move into a platoon traveling state. When determining to move into the platoon traveling state, the travel control device 5 executes processing for platoon traveling control. In other words, the travel control device 5 performs platoon traveling control on the basis of information of the traveling state of the vehicle, the preceding vehicle detection information by the outside recognition device 3, and the information of the other vehicles surrounding the vehicle obtained from the communication device 4. In addition, when determining that an ACC traveling operation request in the control operating switch 1 is ON (control operation request), the travel control device 5 performs ACC traveling control on the basis of the traveling state information of the vehicle and the preceding vehicle detection information by the outside recognition device 3. Even the ACC traveling control may use preceding vehicle traveling information by acquiring the information through inter-vehicle communication.

In performing the ACC traveling control, the travel control device 5 executes following traveling control by using, as a target inter-vehicle time, an inter-vehicle time based on an inter-vehicle distance set by a passenger or a previously set inter-vehicle time for ACC traveling. In addition, in executing the processing for platoon traveling control, the travel control device 5 executes following traveling control with respect to a preceding vehicle so as to maintain a target inter-vehicle time for platoon traveling when the vehicle is not a lead vehicle. The target inter-vehicle time for platoon traveling is, for example, set to be smaller than a target inter-vehicle time during ACC control. The travel control device 5 outputs each command value (a braking and driving force control amount) of a braking command or a driving command calculated for the above following traveling control to the brake controller 6 and the driving-steering controller 7. Additionally, the travel control device 5 outputs a steering command to the driving-steering controller 7 when steering of the vehicle is necessary.

The brake controller 6 and the driving-steering controller 7, respectively, receive command values (the braking and driving force control amounts) of the braking command or the driving command from the travel control device 5 as an upper controller, and control acceleration/deceleration of the vehicle so as to follow respective received command values (the braking and driving force control amounts). The brake controller 6 and the driving-steering controller 7 form an acceleration/deceleration control device.

The brake controller 6 controls a braking force generated by the brake device 9 to a value corresponding to the respective command values (the braking and driving force control amounts) from the travel control device 5 with the fluid pressure circuit 8. The fluid pressure circuit 8 regulates the pressure of a fluid that flows into the brake device 9 according to a control command from the brake controller 6. The fluid pressure circuit 8 includes pipes and a regulating valve connected to the brake device 9 as well as a brake cylinder. The brake device 9 is provided at wheels 11 and puts a brake on the wheels 11 typically by using a frictional force. As the brake device 9, a hydraulic disc brake is generally mainstream, and other known examples thereof include a drum brake, a parking (side) brake, an air-type brake, and an exhaust brake. In other words, a brake fluid (oil), compressed air or the like is typically used as a fluid. In addition, the brake device 9 is not limited to a device applying a braking force by a fluid pressure, and may be an electric brake device or the like. The brake controller 6, the fluid pressure circuit 8, and the brake device 9 form a braking device that generates a braking force.

The driving-steering controller 7 controls a torque (a driving force) generated by a drive source of the driving-steering device 10 according to the respective command values (the braking and driving force control amounts) from the travel control device 5. The drive source of the driving-steering device 10 generates a driving force (a driving torque) to rotate the wheels 11. The drive source of the driving-steering device 10 is not limited to a typical engine and may be an electric motor or a hybrid structure as a combination of an engine and a motor. Additionally, the driving-steering controller 7 controls a steering mechanism of the driving-steering device 10 according to the steering command from the travel control device 5 to change the directions of the wheels 11. In general, the drive source and the steering mechanism of the driving-steering device 10 are independent from each other. The present embodiment will collectively describe the drive source and the steering mechanism in order to simplify the description. Herein, an FF vehicle (a front-engine front-drive vehicle) is assumed as the vehicle, but in fact, the vehicle may be an FR vehicle (a front-engine rear-drive vehicle), 4WD (a four-wheel drive vehicle), or the like. Obviously, the vehicle may also be a midship vehicle. Alternatively, the vehicle may be a motor-assisted vehicle in which one-side wheels of the front and rear wheels are driven by a motive power from an engine and other-side wheels thereof are driven, as appropriate, by a motive power from an electric motor via a clutch, as in e4WD (registered trade mark).

Figure 2:
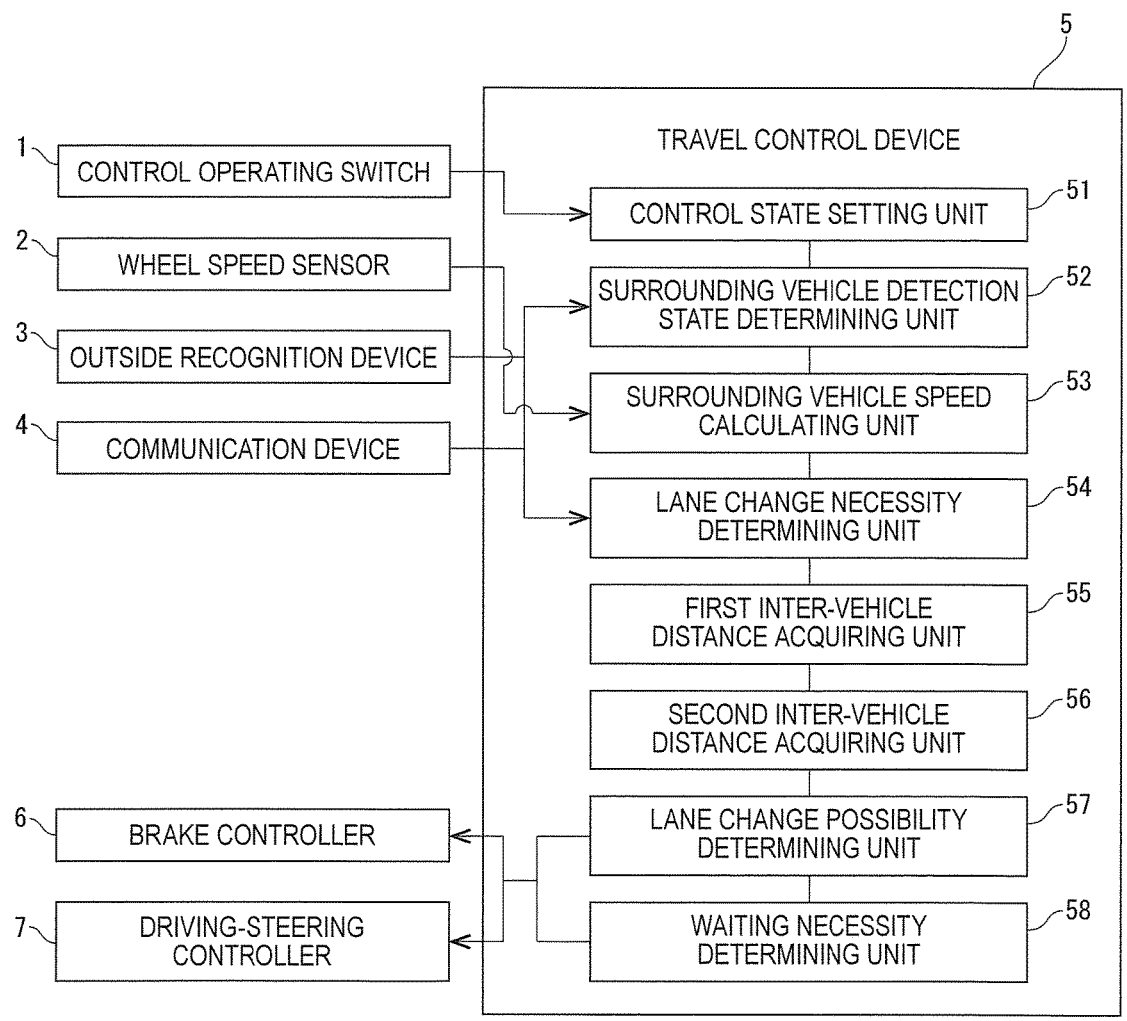
FIG. 2 is a conceptual diagram of a travel control device.

As depicted in FIG. 2, the travel control device 5 according to the present embodiment includes a control state setting unit 51, a surrounding vehicle detection state determining unit 52, a surrounding vehicle speed calculating unit 53, a lane change necessity determining unit 54, a first inter-vehicle distance acquiring unit 55, a second inter-vehicle distance acquiring unit 56, a lane change possibility determining unit 57, and a waiting necessity determining unit 58. An example of the travel control device 5 is assumed to be an electronic control device (ECU) that is mounted in a vehicle. In addition, since the electronic control device (ECU) is generally inseparable from the vehicle, the travel control device 5 may be read as the vehicle.

The control state setting unit 51 detects a state of the control operating switch 1 operated by a passenger, and based on the operation state of the control operating switch 1, determines the presence or absence of various kinds of switching operations for operating control. Herein, when determining that platoon traveling will be executed, the control state setting unit 51 sets a vehicle speed for the vehicle according to a target inter-vehicle time for platoon traveling during following traveling. At this time, an operation command may be output to the surrounding vehicle detection state determining unit 52. In addition, when the existence of any preceding vehicle is not detected during ACC traveling, the set vehicle speed is assumed to be a vehicle-speed command value. When the vehicle is a lead vehicle during platoon traveling, a set vehicle speed for platoon traveling is assumed to be a vehicle-speed command value. In other words, the above set vehicle speed is not necessarily the same between during ACC traveling control and during platoon traveling control.

The surrounding vehicle detection state determining unit 52, as appropriate or upon reception of the operation command from the control state setting unit 51, determines the presence or absence of other vehicles around the vehicle on the basis of inter-vehicle relative values between the other vehicles around the vehicle and the vehicle obtained from a vehicle detection device mounted in the vehicle. Herein, inter-vehicle relative value in the present embodiment includes an inter-vehicle distance with respect to the vehicle and a relative speed with respect thereto. For example, using the outside recognition device 3 (a camera, a laser, a radar, or the like) or the communication device 4 (inter-vehicle communication, road-vehicle communication, or the like), the surrounding vehicle detection state determining unit 52 acquires an inter-vehicle relative value (an inter-vehicle distance and a relative speed with respect to the vehicle) and determines the presence or absence of a preceding adjacent vehicle in a lateral forward direction of the vehicle and a subsequent adjacent vehicle in a lateral rearward direction of the vehicle on the adjacent lane. Obviously, it is also possible to determine the presence or absence of a preceding vehicle in front of the vehicle and a subsequent vehicle behind the vehicle on the own lane, but the description of the case will be omitted. In addition, the surrounding vehicle detection state determining unit 52 may be adapted to detect vehicle positions (positional information) of the other vehicles around the vehicle by GPS, map matching using a digital map data base and a camera or a laser, or vehicle position measurement using a magnetic marker or the like located on a trajectory. In addition, the surrounding vehicle detection state determining unit 52 may directly acquire the vehicle positions of the other vehicles around the vehicle via the communication device 4 (inter-vehicle communication, road-vehicle communication, or the like). Herein, the own lane is a lane (a travel path) where the vehicle is currently traveling. In addition, the adjacent lane is a lane that is adjacent to the own lane and that is a lane that will be a destination for the vehicle to move to. Additionally, the surrounding vehicle detection state determining unit 52 may be adapted to operate only when it has received an operation command from the lane change necessity determining unit 54 that will be described later.

When other vehicles around the vehicle are detected by the surrounding vehicle detection state determining unit 52, the surrounding vehicle speed calculating unit 53 calculates, for each detected vehicle, the speed of each vehicle on the basis of a relative speed of each vehicle with respect to a speed of the vehicle. In other words, the speed of each vehicle is an estimated value. The surrounding vehicle speed calculating unit 53 may be adapted, if necessary, to calculate the speed of the vehicle by using the wheel speed sensor 2. In addition, the surrounding vehicle speed calculating unit 53 may acquire the speed of each vehicle via the communication device 4 (inter-vehicle communication, road-vehicle communication, or the like). Additionally, the surrounding vehicle speed calculating unit 53 can check the speed of the vehicle and the speed of an adjacent vehicle on the adjacent lane to check whether the own lane is a higher speed lane or a lower speed lane than the adjacent lane.

The lane change necessity determining unit 54 determines whether or not to make a lane change from the own lane to the adjacent lane. For example, the lane change necessity determining unit 54 determines to make a lane change of the vehicle when detecting a willingness (intention) to change lanes by operation of the control operating switch 1, a directional indicator, a steering wheel, or the like by the passenger. Alternatively, when detecting approach to "another vehicle around the vehicle" by the outside recognition device 3 (a camera, a laser, a radar, or the like), the communication device 4 (inter-vehicle communication, road-vehicle communication, or the like), or the like, the lane change necessity determining unit 54 may determine to change the lane of the vehicle. Considerable examples of the case of approach of the vehicle to another vehicle therearound include deceleration of a preceding vehicle on the own lane (approach to the preceding vehicle), acceleration of a subsequent vehicle on the own lane (approach to the subsequent vehicle), and a lateral movement of the vehicle (approach to a preceding adjacent vehicle or a subsequent adjacent vehicle on the adjacent lane). In addition, the lane change necessity determining unit 54 may determine to change lanes when it determines that it is preferable to travel on the adjacent lane rather than on the own lane by checking the speed of the vehicle and the speeds of other vehicles around the vehicle. Additionally, when detecting an approach to "a white line at a boundary between the own lane and the adjacent lane" through a camera or the like, the lane change necessity determining unit 54 may determine to change the lane of the vehicle. When determining to change the lane of the vehicle, the lane change necessity determining unit 54 outputs an operation command to at least one of the surrounding vehicle detection state determining unit 52, the first inter-vehicle distance acquiring unit 55 (and the second inter-vehicle distance acquiring unit 56), and the lane change possibility determining unit 57. In addition, in a case of continuing to determine the possibility of a lane change for the vehicle at all times (unconditionally) during traveling of the vehicle regardless of the willingness (intention) to change lanes and the necessity for a lane change, the lane change necessity determining unit 54 does not need to operate. In this case, the lane change necessity determining unit 54 is not required.

The first inter-vehicle distance acquiring unit 55 acquires "a first inter-vehicle distance" representing an inter-vehicle distance (a width of a target space) that serves as a target for the lane change of the vehicle on the basis of an inter-vehicle distance (or a vehicle position) obtained by the surrounding vehicle detection state determining unit 52. For example, the first inter-vehicle distance is an inter-vehicle distance between two adjacent vehicles positioned in a lateral forward direction and a lateral rearward direction of the vehicle on the adjacent lane. Herein, the first inter-vehicle distance acquiring unit 55 acquires "an inter-lateral adjacent vehicle distance" as the first inter-vehicle distance. The inter-lateral adjacent vehicle distance is an inter-vehicle distance between a first preceding adjacent vehicle in the lateral forward direction of the vehicle and a first subsequent adjacent vehicle in the lateral rearward direction of the vehicle on the adjacent lane. However, actually, the first inter-vehicle distance is not limited to the inter-lateral adjacent vehicle distance. For example, the first inter-vehicle distance acquiring unit 55 may be adapted to acquire previously (in advance) an inter-vehicle distance that may be "an inter-lateral vehicle distance" in the near feature on the adjacent lane, as the first inter-vehicle distance. The first inter-vehicle distance acquiring unit 55 starts operation when the surrounding vehicle detection state determining unit 52 has acquired the inter-vehicle distance (or the vehicle position). Alternatively, the first inter-vehicle distance acquiring unit 55 may be adapted to start operation upon reception of the operation command from the lane change necessity determining unit 54.

The second inter-vehicle distance acquiring unit 56 acquires "a second inter-vehicle distance" representing another inter-vehicle distance positioned in front of or behind the inter-vehicle distance that serves as a target for the lane change of the vehicle on the basis of the inter-vehicle distance (or the vehicle position) obtained by the surrounding vehicle detection state determining unit 52. For example, the second inter-vehicle distance is an inter-vehicle distance between an adjacent vehicle positioned in the lateral rearward direction of the vehicle and an adjacent vehicle positioned further therebehind on the adjacent lane or an inter-vehicle distance between an adjacent vehicle positioned in the lateral forward direction of the vehicle and an adjacent vehicle positioned further in front thereof on the adjacent lane. Herein, the second inter-vehicle distance acquiring unit 56 acquires, as the second inter-vehicle distance, "an inter-subsequent adjacent vehicle distance" or "an inter-preceding adjacent vehicle distance" or both thereof. The inter-subsequent adjacent vehicle distance is an inter-vehicle distance between a first subsequent adjacent vehicle and a second subsequent adjacent vehicle as a vehicle subsequent thereto on the adjacent lane. The inter-preceding adjacent vehicle distance is an inter-vehicle distance between a first preceding adjacent vehicle and a second preceding adjacent vehicle as a vehicle preceding thereto on the adjacent lane. However, actually, the second inter-vehicle distance acquiring unit 56 may further acquire an inter-vehicle distance between the second subsequent adjacent vehicle and a vehicle subsequent thereto and/or an inter-vehicle distance between the second preceding adjacent vehicle and a vehicle preceding thereto. In other words, the second inter-vehicle distance acquiring unit 56 may acquire, as the second inter-vehicle distance, a plurality of inter-vehicle distances continuing in a front-rear direction on the basis of the inter-vehicle distance serving as the target for the lane change of the vehicle. The second inter-vehicle distance acquiring unit 56 starts operation when the first inter-vehicle distance acquiring unit 55 has acquired the first inter-vehicle distance. Alternatively, the second inter-vehicle distance acquiring unit 56 may start operation upon reception of the operation command from the lane change necessity determining unit 54. In addition, actually, the first inter-vehicle distance acquiring unit 55 and the second inter-vehicle distance acquiring unit 56 may be integrated with each other.

The lane change possibility determining unit 57 determines the possibility of a lane change of the vehicle by using the first inter-vehicle distance acquired by the first inter-vehicle distance acquiring unit 55. Herein, the lane change possibility determining unit 57 determines the possibility of the lane change of the vehicle by using "the inter-lateral adjacent vehicle distance". When determining that the vehicle can change lanes, the lane change possibility determining unit 57 outputs a control command to the brake device 9 and the driving-steering device 10 via the brake controller 6 and the driving-steering controller 7. The brake device 9 and the driving-steering device 10 adjust the speed of the vehicle and steer according to the control command to execute the lane change of the vehicle. Furthermore, the lane change possibility determining unit 57 may output an operation command for the directional indicator or the like to automatically perform an intention indication for the lane change by the directional indicator or the like. Additionally, the lane change possibility determining unit 57 may be adapted to output a control command for performing screen display onto a display or audio output from an audio output device to notify the possibility of the lane change and the execution (or planned execution) of the lane change to the passenger through the screen display or the audio output. The lane change possibility determining unit 57 starts operation when the first inter-vehicle distance acquiring unit 55 has acquired the first inter-vehicle distance. Alternatively, the lane change possibility determining unit 57 may be adapted to start operation upon reception of the operation command from the lane change necessity determining unit 54. Additionally, actually, the lane change necessity determining unit 54 and the lane change possibility determining unit 57 may be integrated with each other.

When it is determined by the lane change possibility determining unit 57 that the lane change of the vehicle is not executable, the waiting necessity determining unit 58 uses the second inter-vehicle distance acquired by the second inter-vehicle distance acquiring unit 56 to determine the presence or absence of the possibility that the first inter-vehicle distance will extend to the length that allows for the lane change, and determines whether or not to wait by the presence or absence of the possibility of the first inter-vehicle distance that will extend to the length allowing for the lane change. For example, when an adjacent vehicle positioned at a boundary between the first inter-vehicle distance and the second inter-vehicle distance moves forward or rearward and thereby the second inter-vehicle distance becomes shorter, the first inter-vehicle distance becomes longer, whereas when the second inter-vehicle distance becomes longer, the first inter-vehicle distance becomes shorter. Herein, the waiting necessity determining unit 58 uses "an inter-subsequent adjacent vehicle distance" or "an inter-preceding adjacent vehicle distance" or both thereof to, depending on a change(s) in the length(s) thereof, determine the presence or absence of the possibility of the first inter-vehicle distance that will extend to the length allowing for the lane change.

The waiting necessity determining unit 58 determines that waiting is necessary when determining that there is the possibility that the first inter-vehicle distance will extend to the length allowing for the lane change, and outputs a control command to the brake device 9 and the driving-steering device 10 via the brake controller 6 and the driving-steering controller 7. The brake device 9 and the driving-steering device 10 maintain a current traveling state of the vehicle and make the vehicle wait at a position lateral to a first inter-vehicle space that is an inter-vehicle space between the first preceding adjacent vehicle and the first subsequent adjacent vehicle. During waiting, the lane change possibility determining unit 57 periodically uses the first inter-vehicle distance to determine the possibility of the lane change of the vehicle. Herein, the waiting necessity determining unit 58 counts a waiting time. Then, when it is not determined that the lane change of the vehicle is executable even after the passage of a certain length of time (for example, the passage of 10 seconds) from a time when the vehicle starts waiting, the waiting necessity determining unit 58 determines that there is no possibility that the first inter-vehicle distance will extend to the length allowing for the lane change.

The waiting necessity determining unit 58 determines that waiting is unnecessary when determining that there is no possibility that the first inter-vehicle distance will extend to the length allowing for the lane change, and outputs a control command to the brake device 9 and the driving-steering device 10 via the brake controller 6 and the driving-steering controller 7. The brake device 9 and the driving-steering device 10 adjust the speed of the vehicle according to the control command, and move the vehicle to a position lateral to a second inter-vehicle space adjacent in front of or behind the above-described first inter-vehicle space.

At this time, when determining that waiting is unnecessary, the waiting necessity determining unit 58 may use the second inter-vehicle distance to determine a possibility of a lane change of the vehicle to the above second inter-vehicle space. For example, the waiting necessity determining unit 58 uses "an inter-subsequent adjacent vehicle distance" or "an inter-preceding adjacent vehicle distance" or both thereof to determine the possibility of the lane change of the vehicle.

When determining that the lane change of the vehicle to the above second inter-vehicle space is executable, the waiting necessity determining unit 58 outputs a control command to the brake device 9 and the driving-steering device 10 via the brake controller 6 and the driving-steering controller 7. The brake device 9 and the driving-steering device 10 adjust the speed of the vehicle according to the control command and move the vehicle to the position lateral to the above second inter-vehicle space.

In addition, when determining that the lane change of the vehicle to the above second inter-vehicle space is not executable, the waiting necessity determining unit 58 abandons the lane change of the vehicle and outputs a control command to the brake device 9 and the driving-steering device 10 via the brake controller 6 and the driving-steering controller 7. The brake device 9 and the driving-steering device 10 stop waiting according to the control command and continue traveling on the own lane. In other words, without waiting, the vehicle travels on the own lane as usual.

Furthermore, the waiting necessity determining unit 58 may output a control command for performing screen display onto the display or audio output from the audio output device to notify the necessity of waiting or the necessity of movement of the vehicle to the passenger through the screen display or the audio output. In addition, actually, the lane change possibility determining unit 57 and the waiting necessity determining unit 58 may be integrated with each other.

Although not illustrated, the above-described travel control device 5 is achieved by a processor that is driven based on a program and executes predetermined processing and a memory that stores the program and various kinds of data.

The above processor is a CPU, a microprocessor, a microcontroller, a semiconductor integrated circuit (LSI) having dedicated functions, or the like. The above memory is a RAM, a ROM, an EEPROM, a flash memory, or the like. Additionally, together with the above memory or as an alternative to the memory, a storage such as an HDD or an SSD, a removable disc such as a DVD, a storage medium (a medium) such as an SD memory card, or the like may be used. In addition, a buffer, a resistor, or the like may be used.

In addition, the above processor and the above memory may be integrated with each other. For example, recent years have seen an increasing number of single chip microcomputers and the like. Accordingly, there can also be a case in which a single-chip microcomputer that is mounted in an electronic device or the like equivalent to the travel control device 5 is provided with the above processor and the above memory. However, actually, the invention is not limited to the above examples.

Figure 3:
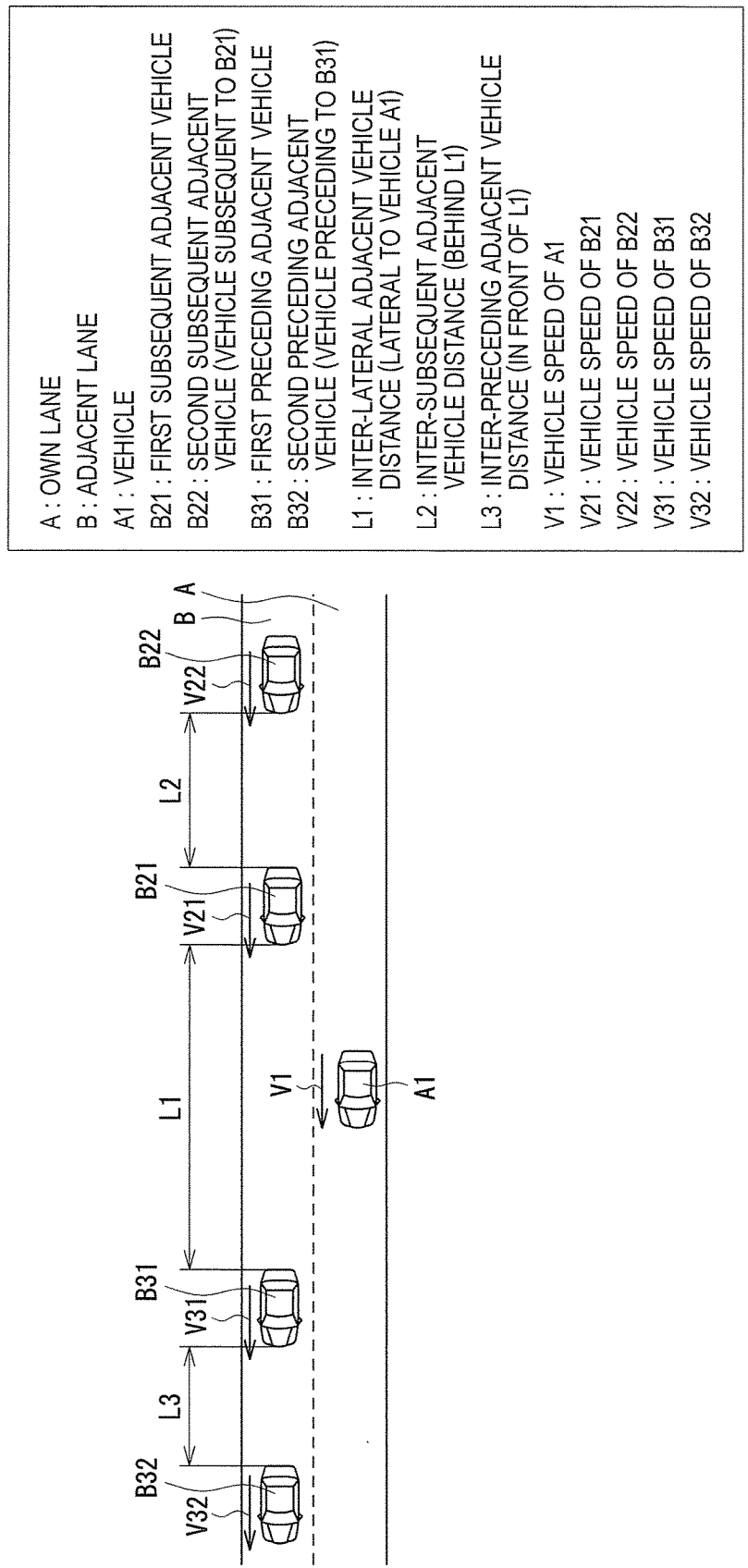
FIG. 3 is a diagram for illustrating a lane change environment (a traffic situation)

A description will be given of a case of determining the possibility of the lane change by taking an example of a lane change environment (a traffic situation) as depicted in FIG. 3.

FIG. 3 illustrates an own lane "A", an adjacent lane "B", a vehicle "A1", a first subsequent adjacent vehicle "B21", a second subsequent adjacent vehicle "B22", a first preceding adjacent vehicle "B31", a second preceding adjacent vehicle "B32", an inter-lateral adjacent vehicle distance "L1", an inter-subsequent adjacent vehicle distance "L2", and an inter-preceding adjacent vehicle distance "L3". In addition, the first subsequent adjacent vehicle "B21", the second subsequent adjacent vehicle "B22", the first preceding adjacent vehicle "B31", and the second preceding adjacent vehicle "B32" are vehicles on the adjacent lane "B". The first subsequent adjacent vehicle "B21" and the second subsequent adjacent vehicle "B22" are vehicles positioned behind the vehicle "A1" in the front-rear direction. The second subsequent adjacent vehicle "B22" is a vehicle subsequent to the first subsequent adjacent vehicle "B21". The first preceding adjacent vehicle "B31" and the second preceding adjacent vehicle "B32" are vehicles in front of the vehicle "A1" in the front-rear direction. The second preceding adjacent vehicle "B32" is a vehicle preceding to the first preceding adjacent vehicle "B31". The inter-lateral adjacent vehicle distance "L1" is an inter-vehicle distance between the first preceding adjacent vehicle "B31" and the first subsequent adjacent vehicle "B21". The inter-subsequent adjacent vehicle distance "L2" is an inter-vehicle distance between the first subsequent adjacent vehicle "B21" and the second subsequent adjacent vehicle "B22". The inter-subsequent adjacent vehicle distance "L3" is an inter-vehicle distance between the first preceding adjacent vehicle "B31" and the second preceding adjacent vehicle "B32".

In the lane change environment as depicted in FIG. 3, the surrounding vehicle detection state determining unit 52 acquires an inter-vehicle distance and a relative speed of each of the first subsequent adjacent vehicle "B21", the second subsequent adjacent vehicle "B22", the first preceding adjacent vehicle "B31", and the second preceding adjacent vehicle "B32" with respect to the vehicle "A1" to check the presence or absence of each vehicle. In addition, the surrounding vehicle speed calculating unit 53 calculates, based on an vehicle speed "V1" representing the speed of the vehicle "A1" and the relative speed of the first subsequent adjacent vehicle "B21", a first subsequent adjacent vehicle speed "V21" representing the speed of the first subsequent adjacent vehicle "B21". Similarly, based on the vehicle speed "V1" and the relative speed of the first preceding adjacent vehicle "B31", the surrounding vehicle speed calculating unit 53 calculates a first preceding adjacent vehicle speed "V31" representing the speed of the first preceding adjacent vehicle "B31". In addition, with regard to the second subsequent adjacent vehicle "B22" and the second preceding adjacent vehicle "B32", either one of the speeds of them may be calculated. The surrounding vehicle speed calculating unit 53 calculates the vehicle speed "V1" by using the wheel speed sensor 2, if necessary. Additionally, actually, the surrounding vehicle speed calculating unit 53 may acquire the first subsequent adjacent vehicle speed "V21" and the first preceding adjacent vehicle "V31" via the communication device 4 (inter-vehicle communication, road-vehicle communication, or the like). Next, the first inter-vehicle distance acquiring unit 55 acquires the inter-lateral adjacent vehicle distance "L1" at the position lateral to the vehicle. The second inter-vehicle distance acquiring unit 56 calculates the inter-subsequent adjacent vehicle distance "L2" in the lateral rearward direction of the vehicle and the inter-preceding adjacent vehicle distance "L3" in the lateral forward direction thereof. In addition, with regard to the inter-subsequent adjacent vehicle distance "L2" and the inter-preceding adjacent vehicle distance "L3", either one of them may be calculated.

In addition, in the lane change environment as depicted in FIG. 3, the surrounding vehicle speed calculating unit 53 checks whether the own lane is a higher speed lane or a lower speed lane than the adjacent lane. It is possible to check whether the own lane is a higher or lower speed lane than the adjacent lane by comparing the vehicle speed "V1" with the first subsequent adjacent vehicle speed "V21" and the first preceding adjacent vehicle speed "V31". For example, when the vehicle speed "V1" is higher than the first subsequent adjacent vehicle speed "V21" and the first preceding adjacent vehicle speed "V31", the own lane can be determined to be a higher speed lane than the adjacent lane. Additionally, when the vehicle speed "V1" is lower than the first subsequent adjacent vehicle speed "V21" and the first preceding adjacent vehicle speed "V31", the own lane can be determined to be a lower speed lane than the adjacent lane. When the own lane is a higher speed lane than the adjacent lane, the waiting necessity determining unit 58 uses information of the inter-subsequent adjacent vehicle distance "L2" to determine the presence or absence of a possibility that the inter-lateral adjacent vehicle distance "L1" will extend to a length allowing for a lane change by a change in the length of the inter-subsequent adjacent vehicle distance "L2". In addition, when the own lane is a lower speed lane than the adjacent lane, the waiting necessity determining unit 58 uses information of the inter-preceding adjacent vehicle distance "L3" to determine the presence or absence of the possibility that the inter-lateral adjacent vehicle distance "L1" will extend to the length allowing for the lane change by a change in the length of the inter-preceding adjacent vehicle distance "L3". Details thereof will be described below.

Figure 4:
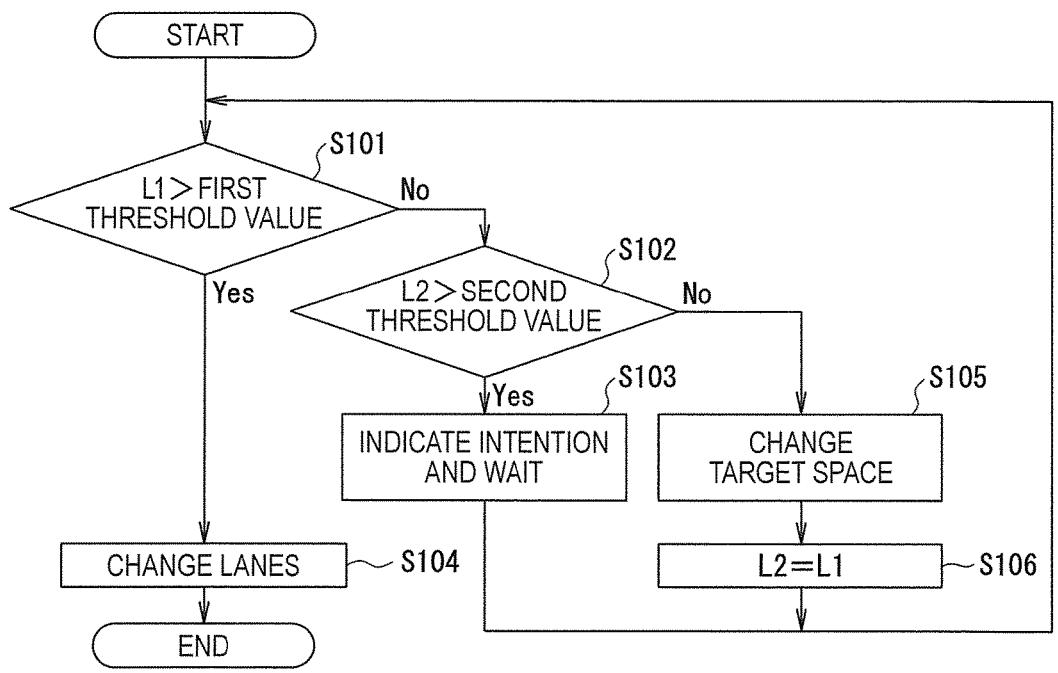
FIG. 4 is a flowchart for illustrating a lane change from a high speed vehicle lane to a low speed vehicle lane.

First, with reference to FIG. 4, a description will be given of a case in which the own lane is a higher speed lane than the adjacent lane. In this case, by focusing on the inter-subsequent adjacent vehicle distance "L2", a determination will be made as to the presence or absence of the possibility that the inter-lateral adjacent vehicle distance "L1" will extend to a length that allows for a lane change.

At step S101, the lane change possibility determining unit 57 checks whether or not the inter-lateral adjacent vehicle distance "L1" is larger than a first threshold value. At this time, not only the determination about the inter-lateral adjacent vehicle distance "L1" but also a determination about a relative speed between the vehicle "A1" and the first subsequent adjacent vehicle "B21" and a determination about a distance between a position of the vehicle "A1" and a lane change end point may be made in combination therewith. The first threshold value represents an inter-vehicle distance necessary for the vehicle "A1" to change lanes. Details of the first threshold value will be described later. When the inter-lateral adjacent vehicle distance "L1" is smaller than the first threshold value (No at step S101), the inter-lateral adjacent vehicle distance "L1" is insufficient. Thus, the lane change is determined not to be executable, and flow proceeds to step S102. In addition, when the inter-lateral adjacent vehicle distance "L1" is larger than the first threshold value, the inter-lateral adjacent vehicle distance "L1" is sufficient. Thus, the lane change is determined to be executable (Yes at step S101), and the flow proceeds to step S104.

At step S102, the waiting necessity determining unit 58 checks whether or not the inter-subsequent adjacent vehicle distance "L2" is larger than a second threshold value. The second threshold value represents an inter-vehicle distance necessary for the first subsequent adjacent vehicle "B21" to extend the inter-lateral adjacent vehicle distance "L1" (to relatively move rearward). Details of the second threshold value will be described later. When the inter-subsequent adjacent vehicle distance "L2" is larger than the second threshold value (Yes at step S102), the flow proceeds to step S103. In addition, when the inter-subsequent adjacent vehicle distance "L2" is smaller than the second threshold value (No at step S102), the flow proceeds to step S105.

At step S103, the waiting necessity determining unit 58 determines that there is a possibility that the first subsequent adjacent vehicle "B21" will decelerate with respect to the vehicle "A1" to extend the inter-lateral adjacent vehicle distance "L1". For example, as depicted in FIG. 5A, in the case of a situation in which the inter-lateral adjacent vehicle distance "L1" is smaller than the first threshold value and the inter-subsequent adjacent vehicle distance "L2" is larger than the second threshold value (L1<first threshold value and L2>second threshold value), it is determined that there is the possibility that the inter-lateral adjacent vehicle distance "L1" will extend to the length that allows for the lane change (a high probability). At this time, the passenger of the vehicle "A1" indicates an intention to change lanes by the directional indicator or the like, and the vehicle waits at a position lateral to the first inter-vehicle space represented by the inter-lateral adjacent vehicle distance "L1" until the inter-lateral adjacent vehicle distance "L1" exceeds the first threshold value (proceed to S101). An upper limit may be set to the waiting time at this time or waiting may be cancelled by operation of the passenger. In addition, the passenger may be read as the lane change possibility determining unit 57 or the waiting necessity determining unit 58. For example, instead of the passenger, the lane change possibility determining unit 57 or the waiting necessity determining unit 58 may be adapted to automatically indicate the intention to change lanes by the directional indicator or the like. When the inter-lateral adjacent vehicle distance "L1" becomes larger than the first threshold value (Yes at step S101 after proceeding) by deceleration of the first subsequent adjacent vehicle "B21" with respect to the vehicle "A1" to extend the inter-lateral adjacent vehicle distance "L1" during waiting, the lane change possibility determining unit 57 determines that lane change is executable due to the sufficient inter-lateral adjacent vehicle distance "L1", and the flow proceeds to step S104.

At step S104, the lane change possibility determining unit 57 outputs a control command to the brake device 9 and the driving-steering device 10 via the brake controller 6 and the driving-steering controller 7. The brake device 9 and the driving-steering device 10 adjust the speed of the vehicle "A1" and steer according to the control command to execute the lane change of the vehicle "A1". For example, a lane change into the inter-lateral adjacent vehicle distance "L1" is executed when the inter-lateral adjacent vehicle distance "L1" is larger than the first threshold value at the present moment or when the first subsequent adjacent vehicle "B21" has decelerated in response to the indication of the intention by the passenger of the vehicle "A1" and thereby the inter-lateral adjacent vehicle distance "L1" has become larger than the first threshold value during waiting at the position lateral to the first inter-vehicle space represented by the inter-lateral adjacent vehicle distance "L1".

At step S105, the waiting necessity determining unit 58 determines that waiting is unnecessary since there is no possibility that the first subsequent adjacent vehicle "B21" decelerates to extend the inter-lateral adjacent vehicle distance "L1", and the vehicle moves to a position lateral to the second inter-vehicle space represented by another inter-vehicle distance positioned in front of or behind the inter-lateral adjacent vehicle distance "L1". Actually, when determining that waiting is unnecessary, the waiting necessity determining unit 58 may determine the possibility of a lane change of the vehicle into the above other inter-vehicle distance, and then, when it determines that the lane change of the vehicle into the above-mentioned other inter-vehicle distance is executable, the vehicle may be moved to the position lateral to the second inter-vehicle space. In other words, when waiting is determined to be unnecessary, a lane change into the current inter-vehicle space at the position lateral to the vehicle "A1" is abandoned and a lane change into the other inter-vehicle space is attempted. For example, as depicted in FIG. 5B, when the inter-lateral adjacent vehicle distance "L1" is smaller than the first threshold value and the inter-subsequent adjacent vehicle distance "L2" is also smaller than the second threshold value (L1<first threshold value and L2<second threshold value), the waiting necessity determining unit 58 determines that there is no possibility that the inter-lateral adjacent vehicle distance "L1" will extend to the length allowing for the lane change (a low probability), thus determines that waiting is unnecessary, and outputs a control command to the brake device 9 and the driving-steering device 10 via the brake controller 6 and the driving-steering controller 7. The brake device 9 and the driving-steering device 10 adjust the speed of the vehicle "A1" to change the position of the vehicle according to the control command, thereby moving the vehicle to the position lateral to the above second inter-vehicle space. For example, the vehicle "A1" is accelerated so as to be positioned more forward than the first preceding adjacent vehicle "B31". Since the vehicle "A1" is traveling on the higher speed lane than the adjacent lane "B", it can overtake the first preceding adjacent vehicle "B31" when moving to the position lateral to the second inter-vehicle space during following traveling or during a lane change. At a point in time when the vehicle "A1" has overtaken the first preceding adjacent vehicle "B31", the flow proceeds to step S106.

At step S106, the waiting necessity determining unit 58 sets the inter-lateral adjacent vehicle distance "L1" before overtaking the first preceding adjacent vehicle "B31" (the past) to the inter-subsequent adjacent vehicle distance "L2" after overtaking the vehicle "B31" (the current) (L2=L1). For example, at a point in time when the vehicle "A1" has overtaken the first preceding adjacent vehicle "B31" (at a point in time when the first preceding adjacent vehicle "B31" has become the first subsequent adjacent vehicle "B21"), the inter-lateral adjacent vehicle distance "L1" before overtaking is set to the inter-subsequent adjacent vehicle distance "L2". In setting the inter-lateral adjacent vehicle distance "L1" to the inter-subsequent adjacent vehicle distance "L2", the inter-lateral adjacent vehicle distance "L1" of the past may be directly substituted for the inter-subsequent adjacent vehicle distance or may be corrected according to the vehicle speed of the adjacent vehicle and an elapsed time. However, actually, after overtaking the first preceding adjacent vehicle "B31", the inter-subsequent adjacent vehicle distance "L2" may be newly acquired from the second inter-vehicle distance acquiring unit 56.

Additionally, in the above description, even in a case in which the inter-lateral adjacent vehicle distance "L1" is approximately equal to the first threshold value (L1≈first threshold value), it may be determined that the inter-lateral adjacent vehicle distance "L1" is larger than the first threshold value. Similarly, even in a case in which the inter-subsequent adjacent vehicle distance "L2" is approximately equal to the second threshold value (L2≈second threshold value), it may be determined that the inter-subsequent adjacent vehicle distance "L2" is larger than the second threshold value. Herein, the reason for using the expression: approximately equal "≈" is to regard some errors as being acceptable. Obviously, it can also be read as being equal "=". However, actually, the invention is not limited to the above examples.

The first threshold value will be described below.

The lane change possibility determining unit 57 acquires an inter-vehicle time "THW1" that can be previously (in advance) set. The inter-vehicle time "THW1" represents an inter-vehicle time with respect to a vehicle on the adjacent lane "B" necessary when the vehicle "A1" has changed lanes. The waiting necessity determining unit 58 calculates and sets the first threshold value on the basis of the vehicle speed "V1" and the inter-vehicle time "THW1" by the following formula (1):

$$\text{First threshold value} = V1 \times THW1 \qquad (1)$$

For example, when "V1=100 km/h" and "THW1=3 seconds", "first threshold value=approximately 83 m". The first threshold value is variable according to the vehicle speed "V1". Accordingly, the faster the vehicle speed "V1", the longer the first threshold value. In addition, actually, instead of the vehicle speed "V1", it is also conceivable to use a relative speed between the vehicle "A1" and the vehicle on the adjacent lane "B". In this manner, the lane change possibility determining unit 57 sets the first threshold value as an inter-vehicle distance necessary for the vehicle "A1" to change lanes.

The second threshold value will be described below.

The waiting necessity determining unit 58 acquires a previously set subsequent minimum inter-vehicle time "THW2min". The subsequent minimum inter-vehicle time "THW2min" is a minimum inter-vehicle time necessary to be maintained between the first subsequent adjacent vehicle "B21" and the second subsequent adjacent vehicle "B22" during following traveling. The waiting necessity determining unit 58 calculates a subsequent minimum inter-vehicle distance "L2min" between the subsequent adjacent vehicles on the basis of the first subsequent adjacent vehicle speed "V21" and the subsequent minimum inter-vehicle time "THW2min" by the following formula (2):

$$L2\text{min}=THW2\text{min}\times V21 \qquad (2)$$

The subsequent minimum inter-vehicle distance "L2min" is a minimum inter-vehicle distance necessary to be maintained between the first subsequent adjacent vehicle "B21" and the second subsequent adjacent vehicle "B22" during following traveling. For example, setting the subsequent minimum inter-vehicle time "THW2min" to 4 to 5 seconds allows for setting of an inter-vehicle distance that does not seem unusual in a typical traffic scene. Additionally, the waiting necessity determining unit 58 acquires a previously set adjustment allowance "margin". The adjustment allowance "margin" is a distance changeable (variable) according to traveling situations of other vehicles around the vehicle "A1" and of the vehicle "A1" and other conditions. The waiting necessity determining unit 58 calculates and sets the second threshold value on the basis of the subsequent minimum inter-vehicle distance "L2min", the first threshold value, the inter-lateral adjacent vehicle distance "L1", and the adjustment allowance "margin" by the following formula (3):

$$\text{Second threshold value}=L2\text{min}+\text{first threshold value}-L1+\text{margin} \qquad (3)$$

For example, when "L2min=approximately 83 m", "first threshold value=approximately 83 m", "L1=50 m", and "margin=10 m", "second threshold value=approximately 126 m". The second threshold value is variable according to a distance obtained by reducing the inter-vehicle distance "L1" from the first threshold value (a difference between the first threshold value and the inter-vehicle distance "L1"). Accordingly, the longer the inter-vehicle distance "L1" is with respect to the first threshold value, the shorter the second threshold value. This is because when the inter-vehicle distance "L1" is sufficiently long, an inter-vehicle distance necessary for the vehicle "A1" to change lanes is secured even if the first subsequent adjacent vehicle "B21" does not give a space. In this manner, the waiting necessity determining unit 58 sets the second threshold value so that the vehicle "A1" can change lanes even if the first subsequent adjacent vehicle "B21" does not give a space.

Figure 6:
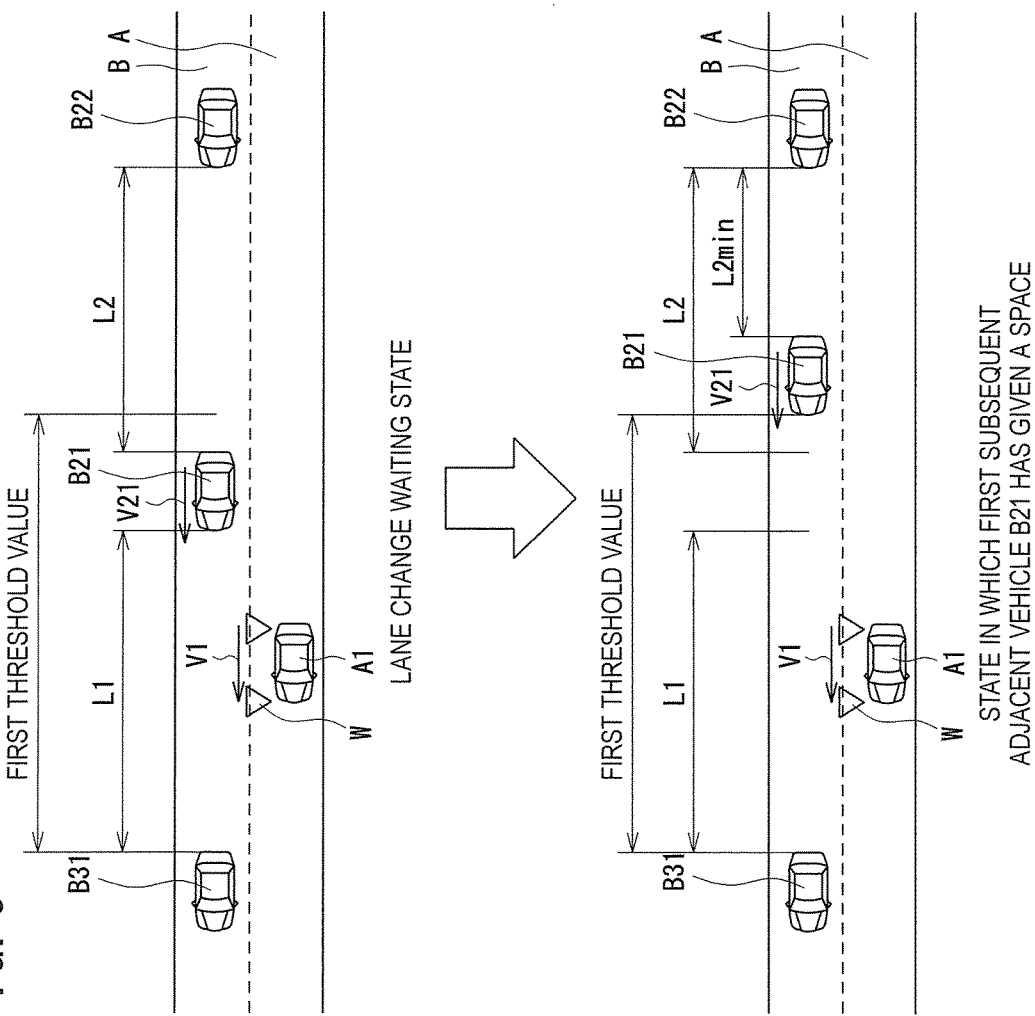
FIG. 6 is a diagram for illustrating a state in which the subsequent adjacent vehicle has given a space.

By setting the second threshold value as described above, the condition of "allowance distance of L2>insufficient distance of L1" is satisfied in a positional relationship that satisfies the condition of "L2>second threshold value". As long as the condition is satisfied, the first subsequent adjacent vehicle "B21" can shift the vehicle position rearward (relatively move rearward by deceleration or maintaining status quo) so as to compensate for an insufficient distance of the inter-lateral adjacent vehicle distance "L1", as depicted in FIG. 6. Thus, when the vehicle "A1" indicates the intention to change lanes, it is determined that there is a possibility that the first subsequent adjacent vehicle "B21" will extend the inter-vehicle distance.

In this manner, when the vehicle "A1" changes lanes, predicting the influence of the first subsequent adjacent vehicle "B21" due to the lane change by using not only the inter-lateral adjacent vehicle distance "L1" but also the inter-subsequent adjacent vehicle distance "L2" allows the possibility of the lane change to be determined with higher accuracy than in conventional techniques. Thereby, in changing lanes, the positional relationship between the three adjacent vehicles can be used to find a space that is most likely to be available, so that the lane change can be made.

Figure 7:
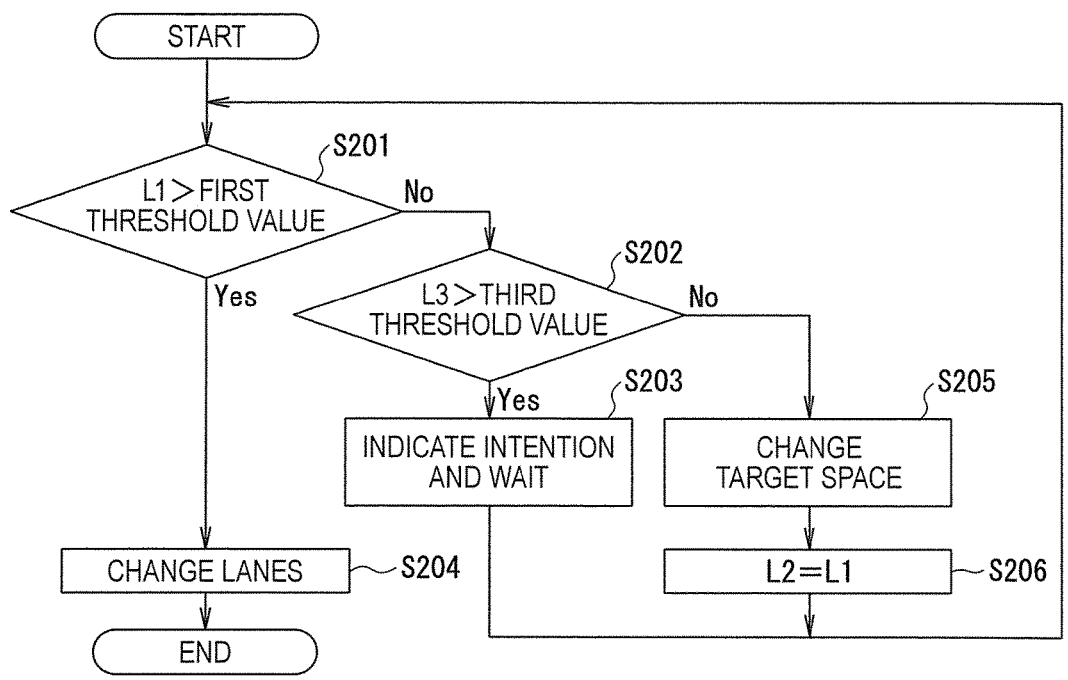
FIG. 7 is a flowchart for illustrating a lane change from a low speed vehicle lane to a high speed vehicle lane.

Next, with reference to FIG. 7, a description will be given of a case in which the own lane is a lower speed lane than the adjacent lane. In this case, by focusing on the inter-preceding adjacent vehicle distance "L3", a determination will be made as to the presence or absence of the possibility that the inter-lateral adjacent vehicle distance "L1" will extend to a length that allows for a lane change.

At step S201, the lane change possibility determining unit 57 checks whether or not the inter-lateral adjacent vehicle distance "L1" is larger than a first threshold value. At this time, not only the determination about the inter-lateral adjacent vehicle distance "L1" but also a determination about a relative speed between the vehicle "A1" and the first preceding adjacent vehicle "B31" and a determination about a distance between a position of the vehicle "A1" and a lane change end point may be made in combination therewith. The details of the first threshold value are as described above. When the inter-lateral adjacent vehicle distance "L1" is smaller than the first threshold value (No at step S201), the inter-lateral adjacent vehicle distance "L1" is insufficient. Thus, the lane change is determined not to be executable, and the flow proceeds to step S202. In addition, when the inter-lateral adjacent vehicle distance "L1" is larger than the first threshold value (Yes at step S201), the inter-lateral adjacent vehicle distance "L1" is sufficient. Thus, the lane change is determined to be executable, and the flow proceeds to step S204.

At step S202, the waiting necessity determining unit 58 checks whether or not the inter-preceding adjacent vehicle distance "L3" is larger than a third threshold value. The third threshold value represents an inter-vehicle distance necessary for the first preceding adjacent vehicle "B31" to extend the inter-lateral adjacent vehicle distance "L1" (to relatively move forward). Details of the third threshold value will be described later. When the inter-preceding adjacent vehicle distance "L3" is larger than the third threshold value (Yes at step S202), the flow proceeds to step S203. In addition, when the inter-preceding adjacent vehicle distance "L3" is smaller than the third threshold value (No at step S202), the flow proceeds to step S205.

At step S203, the waiting necessity determining unit 58 determines that there is a possibility that the first preceding adjacent vehicle "B31" will accelerate with respect to the vehicle "A1" to extend the inter-lateral adjacent vehicle distance "L1". For example, as depicted in FIG. 8A, in the case of a situation in which the inter-lateral adjacent vehicle distance "L1" is smaller than the first threshold value and the inter-preceding adjacent vehicle distance "L3" is larger than the third threshold value (L1<first threshold value and L3>third threshold value), it is determined that there is a possibility that the inter-lateral adjacent vehicle distance "L1" will extend to a length that allows for the lane change. At this time, the passenger of the vehicle "A1" indicates an intention to change lanes by the directional indicator or the like, and the vehicle waits at a position lateral to the first inter-vehicle space represented by the inter-lateral adjacent vehicle distance "L1" until the inter-lateral adjacent vehicle distance "L1" exceeds the first threshold value (proceed to S201). An upper limit may be set to the waiting time at this time or waiting may be cancelled by operation of the passenger. In addition, the passenger may be read as the lane change possibility determining unit 57 or the waiting necessity determining unit 58. For example, instead of the passenger, the lane change possibility determining unit 57 or the waiting necessity determining unit 58 may be adapted to automatically indicate the intention to change lanes by the directional indicator or the like. When the inter-lateral adjacent vehicle distance "L1" has become larger than the first threshold value (Yes at step S201 after proceeding) by acceleration of the first preceding adjacent vehicle "B31" with respect to the vehicle "A1" to extend the inter-lateral adjacent vehicle distance "L1" during waiting, the lane change possibility determining unit 57 determines that the lane change is executable due to the sufficient inter-lateral adjacent vehicle distance "L1", and the flow proceeds to step S204.

At step S204, the lane change possibility determining unit 57 outputs a control command to the brake device 9 and the driving-steering device 10 via the brake controller 6 and the driving-steering controller 7. The brake device 9 and the driving-steering device 10 adjust the speed of the vehicle "A1" and steer according to the control command to make the lane change of the vehicle "A1". For example, a lane change into the inter-lateral adjacent vehicle distance "L1" is executed when the inter-lateral adjacent vehicle distance "L1" is larger than the first threshold value at the present moment or at a point in time when the first preceding adjacent vehicle "B31" has accelerated in response to the indication of the intention by the passenger of the vehicle "A1" and thereby the inter-lateral adjacent vehicle distance "L1" has become larger than the first threshold value during waiting at the position lateral to the first inter-vehicle space represented by the inter-lateral adjacent vehicle distance "L1".

At step S205, the waiting necessity determining unit 58 determines that waiting is unnecessary since there is no possibility that the first preceding adjacent vehicle "B31" will accelerate to extend the inter-lateral adjacent vehicle distance "L1", and the vehicle moves to a position lateral to the second inter-vehicle space represented by another inter-vehicle distance positioned in front of or behind the inter-lateral adjacent vehicle distance "L1". Actually, when determining that waiting is unnecessary, the waiting necessity determining unit 58 determines the possibility of a lane change of the vehicle into the above other inter-vehicle distance. Then, when the lane change of the vehicle into the other inter-vehicle distance is determined to be executable, the vehicle may be moved to the position lateral to the second inter-vehicle space. In other words, when waiting is determined to be unnecessary, a lane change into the current inter-vehicle distance at the position lateral to the vehicle "A1" is abandoned and a lane change into the other inter-vehicle space is attempted. For example, as depicted in FIG. 8B, when the inter-lateral adjacent vehicle distance "L1" is smaller than the first threshold value and the inter-preceding adjacent vehicle distance "L3" is also smaller than the third threshold value (L1<first threshold value and L3<third threshold value), the waiting necessity determining unit 58 determines that there is no possibility that the inter-lateral adjacent vehicle distance "L1" will extend to a length that allows for the lane change, thus determines that waiting is unnecessary, and outputs a control command to the brake device 9 and the driving-steering device 10 via the brake controller 6 and the driving-steering controller 7. The brake device 9 and the driving-steering device 10 adjust the speed of the vehicle "A1" to change the position of vehicle "A1" with respect to the first subsequent adjacent vehicle "B21" according to the control command, thereby moving the vehicle to the position lateral to the above second inter-vehicle space. For example, the vehicle "A1" is decelerated so as to be positioned more rearward than the first subsequent adjacent vehicle "B21". Alternatively, the vehicle "A1" is caused to wait so that the first subsequent adjacent vehicle "B21" is accelerated to be positioned more forward than the vehicle "A1". Since the vehicle "A1" is traveling on the lower speed lane than the adjacent lane "B", the vehicle "A1" allows the first subsequent adjacent vehicle "B21" to pass (precede) when moving to the position lateral to the second inter-vehicle space during following traveling or during a lane change. At a point in time when the vehicle "A1" has been overtaken by the first subsequent adjacent vehicle "B21", the flow proceeds to step S206.

At step S206, the waiting necessity determining unit 58 sets the inter-lateral adjacent vehicle distance "L1" before being overtaken by the first subsequent adjacent vehicle "B21" (the past) to the inter-preceding adjacent vehicle distance "L3" after being overtaken (current) (L3=L1). For example, at a point in time when the vehicle "A1" has been overtaken by the first subsequent adjacent vehicle "B21" (at a point in time when the first subsequent adjacent vehicle "B21" has become the first preceding adjacent vehicle "B31"), the inter-lateral adjacent vehicle distance "L1" before being overtaken is set to the inter-preceding adjacent vehicle distance "L3". In setting the inter-lateral adjacent vehicle distance "L1" to the inter-preceding adjacent vehicle distance "L3", the inter-lateral adjacent vehicle distance "L1" of the past may be directly substituted for the inter-preceding adjacent vehicle distance or may be corrected according to the vehicle speed of the adjacent vehicle and an elapsed time. However, actually, after being overtaken by the first subsequent adjacent vehicle "B21", the inter-preceding adjacent vehicle distance "L3" may be newly acquired from the second inter-vehicle distance acquiring unit 56.

Additionally, in the above description, even in a case in which the inter-lateral adjacent vehicle distance "L1" is approximately equal to the first threshold value (L1≈first threshold value), it may be determined that the inter-lateral adjacent vehicle distance "L1" is larger than the first threshold value. Similarly, even in a case in which the inter-preceding adjacent vehicle distance "L3" is approximately equal to the third threshold value (L3≈third threshold value), it may be determined that the inter-preceding adjacent vehicle distance "L3" is larger than the third threshold value. Herein, the reason for using the expression: approximately equal "≈" is to regard some errors as being acceptable. Obviously, it can also be read as being equal "=". However, actually, the invention is not limited to the above examples.

The third threshold value will be described below.

The waiting necessity determining unit 58 acquires a previously set preceding minimum inter-vehicle time "THW3min". The preceding minimum inter-vehicle time "THW3min" is a minimum inter-vehicle time necessary to be maintained between the first preceding adjacent vehicle "B31" and the second preceding adjacent vehicle "B32" during following traveling. The waiting necessity determining unit 58 calculates a preceding minimum inter-vehicle distance "L3 min" between the preceding adjacent vehicles on the basis of the first preceding adjacent vehicle speed "V31" and the preceding minimum inter-vehicle time "THW3min" by the following formula (4):

$$L3min = THW3min \times V31 \quad (4)$$

The preceding minimum inter-vehicle distance "L3 min" is a minimum inter-vehicle distance necessary to be maintained between the first preceding adjacent vehicle "B31" and the second preceding adjacent vehicle "B32" during following traveling. For example, setting the preceding minimum inter-vehicle time "THW3min" to 4 to 5 seconds allows for setting of an inter-vehicle distance that does not seem unusual in a typical traffic scene. Additionally, the waiting necessity determining unit 58 acquires a previously set adjustment allowance "margin". The adjustment allowance "margin" is as described above. The waiting necessity determining unit 58 calculates and sets a third threshold value on the basis of the preceding minimum inter-vehicle distance "L3 min", first threshold value, the inter-lateral adjacent vehicle distance "L1", and the adjustment allowance "margin" by the following formula (5):

$$\text{Third threshold value} = L3min + \text{first threshold value} - L1 + \text{margin} \quad (5)$$

For example, when "L3 min=approximately 83 m", "first threshold value=approximately 83 m", "L1=50 m", and "margin=10 m", "third threshold value=approximately 126 m". The third threshold value is variable according to a distance obtained by reducing the inter-vehicle distance "L1" from the first threshold value (a difference between the first threshold value and the inter-vehicle distance "L1"). Thus, the longer the inter-vehicle distance "L1" is with respect to the first threshold value, the shorter the third threshold value. This is because when the inter-vehicle distance "L1" is sufficiently long, an inter-vehicle distance necessary for the vehicle "A1" to change lanes is secured even if the first preceding adjacent vehicle "B31" does not give a space. In this manner, the waiting necessity determining unit 58 sets the third threshold value so that the vehicle "A1" can change lanes even if the first preceding adjacent vehicle "B31" does not give a space.

By setting the third threshold value as described above, the condition of "allowance distance of L3>insufficient distance of L1" is satisfied in a positional relationship that satisfies the condition of "L3>third threshold value". As depicted in FIG. 9, the first preceding adjacent vehicle "B31" can shift the vehicle position forward (move forward relatively by acceleration or maintaining status quo) so as to compensate for an insufficient distance of the inter-lateral adjacent vehicle distance "L1". Thus, when the vehicle "A1" indicates an intention to change lanes, it is determined that there is a possibility that the first preceding adjacent vehicle "B31" will extend the inter-vehicle distance.

In this manner, when the vehicle "A1" changes lanes, predicting the influence of the first preceding adjacent vehicle "B31" due to the lane change by using not only the inter-lateral adjacent vehicle distance "L1" but also the inter-preceding adjacent vehicle distance "L3" allows the possibility of the lane change to be determined with higher accuracy than in conventional techniques. Thereby, in changing lanes, the positional relationship between the three adjacent vehicles can be used to find a space that is most likely to be available, so that the lane change can be made.

Next will be a description of the behavior of the vehicle.

The vehicle "A1" executes ACC traveling or platoon traveling by the control state setting unit 51. During traveling on the own lane "A", the vehicle "A1" acquires an inter-vehicle distance and a relative speed (or a vehicle position and a vehicle speed) of each of the first subsequent adjacent vehicle "B21" in the lateral rearward direction of the vehicle, the second subsequent adjacent vehicle "B22" as the vehicle subsequent thereto, the first preceding adjacent vehicle "B31" in the lateral forward direction of the vehicle, and the second preceding adjacent vehicle "B32" as the vehicle preceding thereto on the adjacent lane "B" with respect to the vehicle "A1" by the surrounding vehicle detection state determining unit 52 to determine the presence or absence of each vehicle. Additionally, the surrounding vehicle speed calculating unit 53 calculates the first subsequent adjacent vehicle speed "V21" representing the speed of the first subsequent adjacent vehicle "B21" on the basis of the vehicle speed "V1" representing the speed of the vehicle "A1" and the relative speed of the first subsequent adjacent vehicle "B21". Similarly, on the basis of the vehicle speed "V1" and the relative speed of the first preceding adjacent vehicle "B31", the surrounding vehicle speed calculating unit 53 calculates the first preceding adjacent vehicle speed "V31" representing the speed of the first preceding adjacent vehicle "B31". Furthermore, through the surrounding vehicle speed calculating unit 53, the vehicle "A1" checks at least one of the first subsequent adjacent vehicle speed "V21" and the first preceding adjacent vehicle speed "V31" and the vehicle speed "V1" to check whether the own lane "A" is a higher speed lane or a lower speed lane than the adjacent lane "B". Thereby, the vehicle "A1" can recognize the existence of adjacent vehicles around the vehicle "A1" on the adjacent lane "B". Additionally, through the surrounding vehicle speed calculating unit 53, the vehicle "A1" can understand the speeds of the adjacent vehicles. Furthermore, through the surrounding vehicle speed calculating unit 53, the vehicle "A1" can check the speed of the vehicle "A1" and the speeds of the adjacent vehicles to check whether the own lane "A" is a higher speed lane or a lower speed lane than the adjacent lane "B".

When the first subsequent adjacent vehicle "B21" and the first preceding adjacent vehicle "B31" have been detected by the surrounding vehicle detection state determining unit 52, the vehicle "A1" calculates, through the first inter-vehicle distance acquiring unit 55, the inter-lateral adjacent vehicle distance "L1" on the basis of the inter-vehicle distance with (or the vehicle position of) each of the first subsequent adjacent vehicle "B21" and the first preceding adjacent vehicle "B31". In addition, when the first subsequent adjacent vehicle "B21" and the first preceding adjacent vehicle "B31" have not been detected by the surrounding vehicle detection state determining unit 52, it is obvious that a lane change is executable, without having to calculate the inter-lateral adjacent vehicle distance "L1". In this case, for convenience, the inter-lateral adjacent vehicle distance "L1" may have a value that is infinite or sufficiently large. In addition, actually, the first inter-vehicle distance acquiring unit 55 may calculate the inter-lateral adjacent vehicle distance "L1" before, after, or at the same time when the surrounding vehicle speed calculating unit 53 checks whether the own lane "A" is a higher speed lane or a lower speed lane than the adjacent lane "B". This is because the inter-lateral adjacent vehicle distance "L1" will be calculated in any case regardless of whether it is a higher speed lane or a lower speed lane.

When the own lane "A" is a higher speed lane than the adjacent lane "B" and the second preceding adjacent vehicle "B32" has been detected by the surrounding vehicle detection state determining unit 52, the vehicle "A1" calculates, through the second inter-vehicle distance acquiring unit 56, the inter-subsequent adjacent vehicle distance "L2" on the basis of the inter-vehicle distance with (or the vehicle position of) each of the first subsequent adjacent vehicle "B21" and the second subsequent adjacent vehicle "B22". Through the lane change possibility determining unit 57, the vehicle "A1" determines the possibility of the lane change of the vehicle "A1" by using the inter-lateral adjacent vehicle distance "L1". When the lane change is determined not be executable, the waiting necessity determining unit 58 checks the inter-subsequent adjacent vehicle distance "L2" to determine the presence or absence of the possibility that the inter-lateral adjacent vehicle distance "L1" will extend to a length that allows for the lane change by a change in the length of the inter-subsequent adjacent vehicle distance "L2".

In addition, when the second subsequent adjacent vehicle "B22" has not been detected by the surrounding vehicle detection state determining unit 52, it indicates no existence of the second subsequent adjacent vehicle "B22". Thus, obviously, there is the possibility that the inter-lateral adjacent vehicle distance "L1" will extend to the length that allows for the lane change. In this case, for convenience, the inter-subsequent adjacent vehicle distance "L2" may have a value that is infinite or sufficiently large.

Thereby, the vehicle "A1" automatically determines whether or not the vehicle "A1" can change lanes in the case in which the own lane "A" is a higher speed lane than the adjacent lane "B". Additionally, the vehicle "A1" automatically determines whether there is the possibility that the inter-lateral adjacent vehicle distance "L1" will extend to a length that allows for a lane change in the case in which the vehicle "A1" currently cannot change lanes.

When the own lane "A" is a lower speed lane than the adjacent lane "B" and the second subsequent adjacent vehicle "B22" has been detected by the surrounding vehicle detection state determining unit 52, the vehicle "A1" calculates, through the second inter-vehicle distance acquiring unit 56, the inter-preceding adjacent vehicle distance "L3" on the basis of the inter-vehicle distance with (or the vehicle position of) each of the first preceding adjacent vehicle "B31" and the second preceding adjacent vehicle "B32". Through the lane change possibility determining unit 57, the vehicle "A1" determines the possibility of the lane change of the vehicle "A1" by using the inter-lateral adjacent vehicle distance "L1". When the lane change is determined not to be executable, the waiting necessity determining unit 58 checks the inter-preceding adjacent vehicle distance "L3" to determine the presence or absence of the possibility that the inter-lateral adjacent vehicle distance "L1" will extend to a length that allows for the lane change by a change in the length of the inter-preceding adjacent vehicle distance "L3".

Additionally, when the second preceding adjacent vehicle "B32" has not been detected by the surrounding vehicle detection state determining unit 52, it indicates no existence of the second preceding adjacent vehicle "B32". Thus, obviously, there is the possibility that the inter-lateral adjacent vehicle distance "L1" will extend to the length that allows for the lane change. In this case, for convenience, the inter-preceding adjacent vehicle distance "L3" may have a value that is infinite or sufficiently large.

Thereby, the vehicle "A1" automatically determines whether or not the vehicle "A1" can change lanes in the case in which the own lane "A" is a lower speed lane than the adjacent lane "B". Additionally, the vehicle "A1" automatically determines whether there is the possibility that the inter-lateral adjacent vehicle distance "L1" will extend to a length that allows for a lane change in the case in which the vehicle "A1" currently cannot change lanes.

However, actually, regardless of whether the own lane "A" is a higher speed lane or lower speed lane than the adjacent lane "B", when the second subsequent adjacent vehicle "B22" and the second preceding adjacent vehicle "B32" have been both detected by the surrounding vehicle detection state determining unit 52, the vehicle "A1" may calculate, through the second inter-vehicle distance acquiring unit 56, both the inter-subsequent adjacent vehicle distance "L2" and the inter-preceding adjacent vehicle distance "L3".

For example, when both the inter-subsequent adjacent vehicle distance "L2" and the inter-preceding adjacent vehicle distance "L3" have been calculated by the second inter-vehicle distance acquiring unit 56, the vehicle "A1" causes the waiting necessity determining unit 58 to check both the inter-subsequent adjacent vehicle distance "L2" and the inter-preceding adjacent vehicle distance "L3" to determine the presence or absence of the possibility that the inter-lateral adjacent vehicle distance "L1" will extend to a length that allows for a lane change by a change in the length of any of the inter-vehicle distances.

Thereby, when the vehicle "A1" currently cannot change lanes, the vehicle "A1" automatically determines whether there is the possibility that the inter-lateral adjacent vehicle distance "L1" will extend to the length that allows for the lane change.

When the lane change possibility determining unit 57 determines that the lane change is executable or when the waiting necessity determining unit 58 determines that there is the possibility that the inter-lateral adjacent vehicle distance "L1" will extend to the length that allows for the lane change, the vehicle "A1" outputs a control command to the brake device 9 and the driving-steering device 10 via the brake controller 6 and the driving-steering controller 7, and changes lanes by the brake device 9 and the driving-steering device 10.

At this time, the vehicle "A1" may cause the lane change possibility determining unit 57 or the waiting necessity determining unit 58 to output an operation command for the directional indicator or the like to automatically indicate the intention to change lanes by the directional indicator or the like.

In addition, the vehicle "A1" may cause the lane change possibility determining unit 57 or the waiting necessity determining unit 58 to output a control command for performing screen display onto the display or audio output from the audio output device to notify the possibility of the lane change and the execution (or planned execution) of the lane change to the passenger through the screen display or the audio output.

Herein, when the lane change possibility determining unit 57 determines that the lane change is executable, the lane change of the vehicle "A1" can be immediately made. Accordingly, the vehicle "A1" immediately changes lanes from the own lane "A" to the adjacent lane "B" by the brake device 9 and the driving-steering device 10 to move to between the first subsequent adjacent vehicle "B21" and the first preceding adjacent vehicle "B31" and travel on the adjacent lane "B".

Additionally, when the waiting necessity determining unit 58 determines that there is the possibility that the inter-lateral adjacent vehicle distance "L1" will extend to the length that allows for the lane change, the vehicle "A1" maintains the current traveling state and waits. Then, in a case in which an adjacent vehicle gives a space during waiting, the vehicle "A1" changes lanes from the own lane "A" to the adjacent lane "B" by the brake device 9 and the driving-steering device 10 to move to between the first subsequent adjacent vehicle "B21" and the first preceding adjacent vehicle "B31" and travel on the adjacent lane "B".

In addition, the vehicle "A1" causes the waiting necessity determining unit 58 to count a waiting time, determines that there is no possibility of extension of the inter-lateral adjacent vehicle distance "L1" in a case in which no adjacent vehicle gives a space even after a certain length of time passes (for example, 10 seconds pass) from a time when the vehicle "A1" starts waiting, and determines that waiting is unnecessary.

When the waiting necessity determining unit 58 determines that waiting is unnecessary, the vehicle "A1" does not wait and outputs a control command to the brake device 9 and the driving-steering device 10 via the brake controller 6 and the driving-steering controller 7. At this time, when the waiting necessity determining unit 58 determines that there is no possibility of extension of the inter-lateral adjacent vehicle distance "L1", the vehicle "A1" may be determine the possibility of a lane change of the vehicle into another inter-vehicle distance positioned in front of or behind the inter-lateral adjacent vehicle distance "L1". For example, the vehicle "A1" causes the waiting necessity determining unit 58 to determine the possibility of a lane change of the vehicle by using "an inter-subsequent adjacent vehicle distance" or "an inter-preceding adjacent vehicle distance" or both thereof.

When determining through the waiting necessity determining unit 58 that the vehicle can change lanes into the above other inter-vehicle distance, the vehicle "A1" accelerates, decelerates, or maintains a current speed by the brake device 9 and the driving-steering device 10 and moves in the front-rear direction relatively with respect to the adjacent vehicles to move to a position lateral to the second inter-vehicle space that serves as a new target for a lane change.

For example, when the own lane "A" is a higher speed lane than the adjacent lane "B", the vehicle "A1" accelerates or maintains the current speed and moves forward relatively with respect to the first preceding adjacent vehicle "B31" to move to a position lateral to an inter-vehicle distance formed by the first preceding adjacent vehicle "B31" and the second preceding adjacent vehicle "B32", and uses the inter-vehicle distance at the position lateral to the vehicle after the movement, as a new target space for a lane change. Then, the inter-lateral adjacent vehicle distance "L1" before the movement is used as the inter-subsequent adjacent vehicle distance "L2" after the movement.

In addition, when the own lane "A" is a lower speed lane than the adjacent lane "B", the vehicle "A1" decelerates or maintains the current speed and moves rearward relatively with respect to the first subsequent adjacent vehicle "B21" to move to a position lateral to an inter-vehicle distance formed by the first subsequent adjacent vehicle "B21" and the second subsequent adjacent vehicle "B22", and uses the inter-vehicle distance at the position lateral to the vehicle after the movement, as a new target space for a lane change. Then, the inter-lateral adjacent vehicle distance "L1" before the movement is used as the inter-preceding adjacent vehicle distance "L3" after the movement.

In addition, when determining through the waiting necessity determining unit 58 that the vehicle cannot change lanes into the above other inter-vehicle distance, the vehicle "A1" abandons the lane change thereof, stops waiting, and continues to travel on the own lane "A".

Furthermore, through the waiting necessity determining unit 58, the vehicle "A1" may be adapted to output a control command for performing screen display onto the display or audio output from the audio output device to notify the possibility of the lane change and the execution (or planned execution) of the lane change or the necessity of waiting and the necessity of movement of the vehicle to the passenger through the screen display or the audio output.

In the above description, when determining the possibility of a lane change, a probability at which the lane change is executable may be calculated in stages (in small increments) according to the lengths of the inter-subsequent adjacent vehicle distance "L2" and the inter-preceding adjacent vehicle distance "L3", and when the probability is at a certain level (for example, 60%) or more, the lane change may be determined to be possible. For example, when the inter-subsequent adjacent vehicle distance "L2" and the inter-preceding adjacent vehicle distance "L3" are smaller than the respective threshold values (the second threshold value and the third threshold value), the probability at which the lane change is executable may be calculated to be "0%", whereas when the inter-subsequent adjacent vehicle distance "L2" and the inter-preceding adjacent vehicle distance "L3" are larger than (or approximately equal to) the respective threshold values, differences (allowable distances) between the distances and the respective thresholds may be checked and, according to the magnitudes of the differences, calculation may be performed in stages for a probability at which the lane change is executable. Additionally, the probability at which the lane change is executable may be notified to the passenger through screen display or audio output. However, actually, the invention is not limited to the above examples.

In addition, when inter-vehicle communication and road-vehicle communication are possible, the travel control device 5 may be an on-board device or a roadside device. Furthermore, when doing a simulation of a lane change on a computing machine or when a server or the like capable of communicating with the vehicle performs traveling control, the travel control device 5 may be a computing machine such as a personal computer (PC), an appliance, a workstation, a mainframe, or a supercomputer. In this case, the computing machine may be a virtual machine (VM) constructed on a physical machine. In addition, the travel control device 5 may be a car navigation system, a mobile phone, a smart phone, a smart book, a game machine, a head-mounted display, or the like capable of notifying the possibility of a lane change and the execution (or planned execution) of the lane change to the passenger through screen display or audio output. In addition, the travel control device 5 may be mounted, other than in a vehicle, also in a moving unit that moves in a behavior similar to a vehicle. However, actually, the invention is not limited to the above examples.

Additionally, in the lane change possibility determining unit 57 and the waiting necessity determining unit 58 described above, the structures thereof may also be subdivided for each function.

For example, the above-described lane change possibility determining unit 57 can be divided into "a first threshold value calculating unit" and "a first threshold value determining unit". Actually, the lane change possibility determining unit 57 may include "the first threshold value calculating unit" and "the first threshold value determining unit". The first threshold value calculating unit calculates a first threshold value on the basis of the speed of a vehicle. The first threshold value determining unit determines the possibility of a lane change of the vehicle on the basis of a magnitude relationship between the first threshold value and a first inter-vehicle distance.

In addition, the above-described waiting necessity determining unit 58 can be divided into "a second threshold value calculating unit", "a second threshold value determining unit", "a third threshold value calculating unit", and "a third threshold value determining unit". Actually, the waiting necessity determining unit 58 may include "the second threshold value calculating unit", "the second threshold value determining unit", "the third threshold value calculating unit", and "the third threshold value determining unit". Herein, the waiting necessity determining unit 58 may include only "the second threshold value calculating unit and the second threshold value determining unit", or may include only "the third threshold value calculating unit and the third threshold value determining unit". In other words, the structure of the waiting necessity determining unit 58 may be optionally changeable according to the implementation situation. The second threshold value calculating unit and the second threshold value determining unit are used when the second inter-vehicle distance is an inter-subsequent adjacent vehicle distance. The second threshold value calculating unit calculates a second threshold value by using a difference between the first threshold value and the first inter-vehicle distance when the lane change of the vehicle is determined not to be executable. The second threshold value determining unit determines the presence or absence of the possibility that a subsequent adjacent vehicle gives a space so that the vehicle can change lanes on the basis of a magnitude relationship between the second threshold value and the inter-subsequent adjacent vehicle distance. Additionally, the third threshold value calculating unit and the third threshold value determining unit are used when the second inter-vehicle distance is an inter-preceding adjacent vehicle distance. The third threshold value calculating unit calculates a third threshold value by using the difference between the first threshold value and the first inter-vehicle distance when the lane change of the vehicle is determined not to be executable. The third threshold value determining unit determines the presence or absence of the possibility that a preceding adjacent vehicle gives a space so that the vehicle can change lanes on the basis of a magnitude relationship between the third threshold value and the inter-preceding adjacent vehicle distance. However, actually, the invention is not limited to the above examples.

From another viewpoint, the brake controller 6, the driving-steering controller 7, the fluid pressure circuit 8, the brake device 9, the driving-steering device 10, and the wheels 11 form "a target changing unit". The target changing unit waits at the position lateral to the first inter-vehicle space that is the inter-vehicle space between the first preceding adjacent vehicle and the first subsequent adjacent vehicle when the waiting necessity determining unit 58 determines that waiting is necessary. On the other hand, when the waiting necessity determining unit 58 determines that waiting is unnecessary, the target changing unit moves the vehicle to the position lateral to the second inter-vehicle space adjacent in front of or behind the first inter-vehicle space.

In addition, from another viewpoint, the target changing unit may be a display or an audio output device. The target changing unit notifies the possibility of a lane change and the execution (or planned execution) of the lane change or the necessity of waiting and the necessity of movement of the vehicle to the passenger through screen display or audio output. However, actually, the invention is not limited to the above examples.

The present embodiment provides the following advantageous effects:

The travel control device according to the present embodiment acquires, in a position lateral to a vehicle on an adjacent lane adjacent to an own lane, a first inter-vehicle distance that serves as a target for a lane change of the vehicle and is an inter-vehicle distance between a first preceding adjacent vehicle in a lateral forward direction of the vehicle and a first subsequent adjacent vehicle in a lateral rearward direction of the vehicle. The travel control device acquires a second inter-vehicle distance that is at least one inter-vehicle distance of an inter-vehicle distance between the first subsequent adjacent vehicle and a second subsequent adjacent vehicle as a vehicle subsequent thereto and an inter-vehicle distance between the first preceding adjacent vehicle and a second preceding adjacent vehicle as a vehicle preceding thereto. The possibility of a lane change from the own lane to the adjacent lane is determined by using the first inter-vehicle distance. When the lane change from the own lane to the adjacent lane is determined not to be executable, the presence or absence of a possibility that the first inter-vehicle distance will extend to a length that allows for the lane change is determined by using the second inter-vehicle distance. When it is determined that there is the possibility that the first inter-vehicle distance will extend to the length that allows for the lane change, waiting is determined to be necessary. When it is determined that there is no possibility that the first inter-vehicle distance will extend to the length that allows for the lane change, waiting is determined to be unnecessary.

In this manner, when the vehicle changes lanes, by using not only the inter-vehicle distance at the position lateral to the vehicle (the first inter-vehicle distance) but also the second inter-vehicle distance thereof (a second inter-vehicle distance), predicting the influence of the preceding adjacent vehicles and the subsequent adjacent vehicles on the adjacent lane due to the lane change allows the possibility of the lane change to be determined with higher accuracy than in conventional techniques.

(2) Preferably, when waiting is determined to be necessary, the travel control device described above makes the vehicle wait at a position lateral to a first inter-vehicle space that is an inter-vehicle space between the first preceding adjacent vehicle and the first subsequent adjacent vehicle, and, when waiting is determined to be unnecessary, it may move the vehicle to a position lateral to a second inter-vehicle space adjacent in front of or behind the first inter-vehicle distance.

Thereby, an appropriate lane change preparing operation can be performed according to a result of determination for the possibility of a lane change.

(3) The above-described travel control device may determine the possibility of a lane change into the second inter-vehicle space by using the second inter-vehicle distance when waiting is determined to be unnecessary, and may move the vehicle to the position lateral to the above second inter-vehicle space when the lane change into the second inter-vehicle space is determined to be executable.

Thereby, when waiting at the position lateral to the current target inter-vehicle space is determined to be useless, a determination can be made as to the possibility of a lane change into the inter-vehicle space positioned in front of or behind the target inter-vehicle space, thus allowing the determination of the possibility of a lane change to be made in multi-stages.

(4) Herein, an inter-subsequent adjacent vehicle distance is assumed as one second inter-vehicle distance. The inter-subsequent adjacent vehicle distance is an inter-vehicle distance between the first subsequent adjacent vehicle and the second subsequent adjacent vehicle as a vehicle subsequent thereto on the adjacent lane. When the first inter-vehicle distance is smaller than a first threshold value, the above-described travel control device 5 calculates a subsequent minimum inter-vehicle distance between the subsequent adjacent vehicles by multiplying a speed of the first subsequent adjacent vehicle by a previously set subsequent minimum inter-vehicle time. Additionally, the above-described travel control device 5 calculates a second threshold value representing an inter-vehicle distance necessary for the first subsequent adjacent vehicle to extend the first inter-vehicle distance by adding up the subsequent minimum inter-vehicle distance, a value (difference) obtained by reducing the first inter-vehicle distance from the first threshold value, and a previously set adjustment allowance. When the inter-subsequent adjacent vehicle distance is larger than the second threshold value, it is determined that there is a possibility that the first inter-vehicle distance will be larger than the first threshold value. When the inter-subsequent adjacent vehicle distance is smaller than the second threshold value, it is determined that there is no possibility that the first inter-vehicle distance will be larger than the first threshold value.

Thereby, an estimation can be made about a distance that can be given by the first subsequent adjacent vehicle, and a determination can be made with high accuracy as to whether the first subsequent adjacent vehicle gives a space. Additionally, even in a situation in which the own lane is a higher speed lane than the adjacent lane and the first subsequent adjacent vehicle cannot give a space, it can be prevented that the vehicle cannot change lanes and goes into a waiting state.

(5) Additionally, in the above (4), when the vehicle has overtaken the first preceding adjacent vehicle on the adjacent lane, the first inter-vehicle distance of the past is used as a current inter-subsequent adjacent vehicle distance. For example, when it is determined that there is no possibility that the first inter-vehicle distance will be larger than the first threshold value and in the case in which the own lane is a higher speed lane than the adjacent lane, the vehicle overtakes the first preceding adjacent vehicle and the first inter-vehicle distance of the past is used as the current inter-subsequent adjacent vehicle distance.

Thereby, an inter-vehicle distance behind a target space can be estimated.

(6) Additionally, an inter-preceding adjacent vehicle distance is assumed as one second inter-vehicle distance. The inter-preceding adjacent vehicle distance is an inter-vehicle distance between the first preceding adjacent vehicle and the second preceding adjacent vehicle as a vehicle preceding thereto on the adjacent lane. When the first inter-vehicle distance is smaller than the first threshold value, the above-described travel control device 5 calculates a preceding minimum inter-vehicle distance between the preceding adjacent vehicles by multiplying a speed of the first preceding adjacent vehicle by a previously set preceding minimum inter-vehicle time. Additionally, the travel control device 5 calculates a third threshold value representing an inter-vehicle distance necessary for the first preceding adjacent vehicle to extend the first inter-vehicle distance by adding up the preceding minimum inter-vehicle distance, a value obtained by reducing the first inter-vehicle distance from the first threshold value, and a previously set adjustment allowance. When the inter-preceding adjacent vehicle distance is larger than the third threshold value, it is determined that there is a possibility that the first inter-vehicle distance will be larger than the first threshold value. When the inter-preceding adjacent vehicle distance is smaller than the third threshold value, it is determined that there is no possibility that the first inter-vehicle distance will be larger than the first threshold value.

Thereby, an estimation can be made about a distance that can be given by the first preceding adjacent vehicle, and a determination can be made with high accuracy as to whether the first preceding adjacent vehicle gives a space. Additionally, even in a situation in which the own lane is a lower speed lane than the adjacent lane and the first preceding adjacent vehicle cannot give a space, it can be prevented that the vehicle cannot change lanes and goes into a waiting state.

(7) Additionally, in the above (6), in a case in which the vehicle has been overtaken by the first subsequent adjacent vehicle, the first inter-vehicle distance of the past is used as an inter-preceding adjacent vehicle distance. For example, when it is determined that there is no possibility that the first inter-vehicle distance will be larger than the first threshold value and in a case in which the own lane is a lower speed lane than the adjacent lane, the vehicle allows the first subsequent adjacent vehicle to pass (precede), and the first inter-vehicle distance of the past is used as a current inter-preceding adjacent vehicle distance. Thereby, an inter-vehicle distance in front of the target space can be estimated.

According to one aspect of the present invention, a vehicle does not continue to wait at a position lateral to the same inter-vehicle space and can move to a position lateral to another inter-vehicle distance when the own vehicle can change lanes into the other inter-vehicle space.

The invention claimed is:

1. A travel control device for automatic travel control by a vehicle, comprising:
 a first inter-vehicle distance acquiring unit configured to acquire, in a position lateral to the vehicle on an adjacent lane adjacent to a lane on which the vehicle travels, a first inter-vehicle distance that serves as a target for a lane change of the vehicle and is an inter-vehicle distance between a first preceding adjacent vehicle in a lateral forward direction of the vehicle and a first subsequent adjacent vehicle in a lateral rearward direction of the vehicle;
 a second inter-vehicle distance acquiring unit configured to acquire a second inter-vehicle distance that is at least one inter-vehicle distance of
  an inter-vehicle distance between the first subsequent adjacent vehicle and a second subsequent adjacent vehicle as a vehicle subsequent to the first subsequent adjacent vehicle and
  an inter-vehicle distance between the first preceding adjacent vehicle and a second preceding adjacent vehicle as a vehicle preceding to the first preceding adjacent vehicle;
 a lane change possibility determining unit configured to determine a possibility of the lane change from the lane on which the vehicle travels to the adjacent lane by using the first inter-vehicle distance; and
 a waiting necessity determining unit configured, when the lane change possibility determining unit determines that the lane change from the lane on which the vehicle travels to the adjacent lane is not executable, to
determine presence or absence of a possibility that the first inter-vehicle distance will extend to a length that allows for the lane change by using the second inter-vehicle distance,
determine that waiting is necessary when it is determined that there is the possibility that the first inter-vehicle distance will extend to the length that allows for the lane change,
determine that the waiting is unnecessary when it is determined that there is no possibility that the first inter-vehicle distance will extend to the length that allows for the lane change, and
when waiting is unnecessary, output a control command to a brake device or a driving-steering device to perform an automatic travel control that moves the vehicle to a position lateral to a second inter-vehicle space.

2. The travel control device according to claim 1, further comprising a target changing unit configured, when the waiting necessity determining unit determines that the waiting is necessary, to make the vehicle wait at a position lateral to a first inter-vehicle space that is an inter-vehicle space between the first preceding adjacent vehicle and the first subsequent adjacent vehicle, and when the waiting necessity determining unit determines that the waiting is unnecessary, to move the vehicle to a position lateral to a second inter-vehicle space adjacent in front of or behind the first inter-vehicle space.

3. The travel control device according to claim 2, wherein the waiting necessity determining unit is configured to determine the possibility of a lane change into the second inter-vehicle space by using the second inter-vehicle distance when it is determined that the waiting is unnecessary, and
the target changing unit is configured to move the vehicle to the position lateral to the second inter-vehicle space when the waiting necessity determining unit determines that the waiting is unnecessary and the lane change into the second inter-vehicle space is executable.

4. The travel control device according to claim 1,
wherein the second inter-vehicle distance acquiring unit is configured to acquire an inter-subsequent adjacent vehicle distance that is an inter-vehicle distance between the first subsequent adjacent vehicle and the second subsequent adjacent vehicle,
the lane change possibility determining unit includes:
a first threshold value calculating unit configured to calculate a first threshold value by multiplying a speed of the vehicle by a previously set inter-vehicle time; and
a first threshold value determining unit configured to determine that the lane change from the lane on which the vehicle travels to the adjacent lane is executable when the first inter-vehicle distance is larger than the first threshold value, and to determine that the lane change from the lane on which the vehicle travels to the adjacent lane is not executable when the first inter-vehicle distance is smaller than the first threshold value, and
the waiting necessity determining unit includes:
a second threshold value calculating unit configured to calculate a subsequent minimum inter-vehicle distance between the subsequent adjacent vehicles by multiplying a speed of the first subsequent adjacent vehicle by a previously set subsequent minimum inter-vehicle time when the lane change from the lane on which the vehicle travels to the adjacent lane is determined not to be executable, and to calculate a second threshold value by adding up the subsequent minimum inter-vehicle distance, a value obtained by reducing the first inter-vehicle distance from the first threshold value, and a previously set adjustment allowance; and
a second threshold value determining unit configured to determine that there is a possibility that the first inter-vehicle distance will be larger than the first threshold value when the inter-subsequent adjacent vehicle distance is larger than the second threshold value, and to determine that there is no possibility that the first inter-vehicle distance will be larger than the first threshold value when the inter-subsequent adjacent vehicle distance is smaller than the second threshold value.

5. The travel control device according to claim 4, wherein the waiting necessity determining unit is configured to set the first inter-vehicle distance of a past to the inter-subsequent adjacent vehicle distance when the vehicle overtakes the preceding adjacent vehicle on the adjacent lane.

6. The travel control device according to claim 1,
wherein the second inter-vehicle distance acquiring unit is configured acquire to an inter-preceding adjacent vehicle distance that is an inter-vehicle distance between the first preceding adjacent vehicle and the second preceding adjacent vehicle,
the lane change possibility determining unit includes:
a first threshold value calculating unit configured to calculate a first threshold value by multiplying a speed of the vehicle by a previously set inter-vehicle time; and
a first threshold value determining unit configured to determine that the lane change from the lane on which the vehicle travels to the adjacent lane is executable when the first inter-vehicle distance is larger than the first threshold value, and to determine that the lane change from the lane on which the vehicle travels to the adjacent lane is not executable when the first inter-vehicle distance is smaller than the first threshold value, and
the waiting necessity determining unit includes:
a third threshold value calculating unit configured to calculate a preceding minimum inter-vehicle distance between the preceding adjacent vehicles by multiplying a speed of the first preceding adjacent vehicle by a previously set preceding minimum inter-vehicle time when the lane change from the lane on which the vehicle travels to the adjacent lane is determined not to be executable, and to calculate a third threshold value by adding up the preceding minimum inter-vehicle distance, a value obtained by reducing the first inter-vehicle distance from the first threshold value, and a previously set adjustment allowance; and
a third threshold value determining unit configured to determine that there is a possibility that the first inter-vehicle distance will be larger than the first threshold value when the inter-preceding adjacent vehicle distance is larger than the third threshold value, and to determine that there is no possibility that the first inter-vehicle distance will be larger than the first threshold value when the inter-preceding adjacent vehicle distance is smaller than the third threshold value.

7. The travel control device according to claim 6, wherein the waiting necessity determining unit is configured to set the first inter-vehicle distance of a past to the inter-preceding adjacent vehicle distance when the first subsequent adjacent vehicle overtakes the vehicle.

8. A travel control method for automatic travel control by a vehicle, comprising:
   acquiring, in a position lateral to the vehicle on an adjacent lane adjacent to a lane on which the vehicle travels, a first inter-vehicle distance that serves as a target for a lane change of the vehicle and is an inter-vehicle distance between a first preceding adjacent vehicle in a lateral forward direction of the vehicle and a first subsequent adjacent vehicle in a lateral rearward direction of the vehicle;
   acquiring a second inter-vehicle distance that is at least one inter-vehicle distance of an inter-vehicle distance between the first subsequent adjacent vehicle and a second subsequent adjacent vehicle as a vehicle subsequent to the first subsequent adjacent vehicle and an inter-vehicle distance between the first preceding adjacent vehicle and a second preceding adjacent vehicle as a vehicle preceding to the first preceding adjacent vehicle;
   determining a possibility of the lane change from the lane on which the vehicle travels to the adjacent lane by using the first inter-vehicle distance;
   when the lane change from the lane on which the vehicle travels to the adjacent lane is determined not to be executable, determining the presence or absence of a possibility that the first inter-vehicle distance will extend to a length that allows for the lane change by using the second inter-vehicle distance;
   when determining that there is the possibility that the first inter-vehicle distance will extend to the length that allows for the lane change, determining that waiting is necessary; and
   when determining that there is no possibility that the first inter-vehicle distance will extend to the length that allows for the lane change,
      determining that the waiting is unnecessary, and
      outputting a control command to a brake device or a drive-steering device to perform an automatic travel control that moves the vehicle to a position lateral to a second inter-vehicle space.

9. The travel control method according to claim 8, wherein when the waiting is determined to be necessary, making the vehicle wait at a position lateral to a first inter-vehicle space that is an inter-vehicle space between the first preceding adjacent vehicle and the first subsequent adjacent vehicle, and
   when the waiting is determined to be unnecessary, moving the vehicle to a position lateral to a second inter-vehicle space adjacent in front of or behind the first inter-vehicle space.

* * * * *